United States Patent
Kang et al.

(10) Patent No.: US 12,526,577 B2
(45) Date of Patent: Jan. 13, 2026

(54) ELECTRONIC DEVICE COMPRISING SPEAKER AND OPERATION METHOD OF SAME

(71) Applicant: Samsung Electronics Co., Ltd., Suwon-si (KR)

(72) Inventors: Hyunggwang Kang, Suwon-si (KR); Wonho Lee, Suwon-si (KR); Baekeun Cho, Suwon-si (KR); Hyoungtak Cho, Suwon-si (KR); Myunghoon Kwak, Suwon-si (KR); Yangwook Kim, Suwon-si (KR); Soyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 18/299,351

(22) Filed: Apr. 12, 2023

(65) Prior Publication Data

US 2023/0254641 A1    Aug. 10, 2023

Related U.S. Application Data

(63) Continuation of application No. PCT/KR2021/016174, filed on Nov. 9, 2021.

(30) Foreign Application Priority Data

Nov. 17, 2020  (KR) .................. 10-2020-0154071
Apr. 8, 2021  (KR) .................. 10-2021-0046040

(51) Int. Cl.
*H04R 3/04* (2006.01)
*H04R 1/02* (2006.01)
*H04R 1/28* (2006.01)

(52) U.S. Cl.
CPC ............... *H04R 3/04* (2013.01); *H04R 1/028* (2013.01); *H04R 1/2811* (2013.01);
(Continued)

(58) Field of Classification Search
CPC ...... H04R 1/028; H04R 2499/11; H04R 3/04; H04R 2430/01; G09F 9/301; H04M 1/0235; H04M 1/0268; H04M 1/035
See application file for complete search history.

(56) References Cited

U.S. PATENT DOCUMENTS 6,292,563 B1 *  9/2001  Clark .................. H04M 1/6016
                                                          379/433.13
9,253,557 B2    2/2016  Kishinami et al.
(Continued)

FOREIGN PATENT DOCUMENTS

EP    1 596 561 A2    11/2005
EP    3 720 145 A1    10/2020
(Continued)

OTHER PUBLICATIONS

Indian Office Action dated Jan. 3, 2025, issued in Indian Patent Application No. 202317028095.
(Continued)

*Primary Examiner* — James K Mooney
(74) *Attorney, Agent, or Firm* — Jefferson IP Law, LLP

(57) ABSTRACT

An electronic device is provided. The electronic device includes a first housing, a second housing coupled to the first housing, a speaker disposed in the first housing and outputs an audio signal, a flexible display disposed in the first and second housings, and in which a size of a visual area can be expanded according to the movement of the second housing, a first duct line formed in the first housing, a second duct line formed at a position corresponding to the first duct line, and is formed in the second, a third duct line connected to the
(Continued)

first duct line, and is formed in the second housing, and a processor, operatively connected to the speaker and the flexible display, configured to sense the moved distance of the second housing with respect to the first housing, and correct the characteristics of the audio signal based on the sensed moved distance.

21 Claims, 26 Drawing Sheets

(52) U.S. Cl.
CPC ...... *H04R 2430/01* (2013.01); *H04R 2499/11* (2013.01); *H04R 2499/15* (2013.01)

(56) References Cited

U.S. PATENT DOCUMENTS

| | | | |
|---|---|---|---|
| 9,748,646 | B2 | 8/2017 | Kallai et al. |
| 10,887,683 | B1* | 1/2021 | Choi ..................... H04R 1/028 |
| 2008/0268793 | A1 | 10/2008 | Nelson et al. |
| 2018/0098148 | A1 | 4/2018 | Liu et al. |
| 2018/0210560 | A1 | 7/2018 | Xia et al. |
| 2018/0288201 | A1 | 10/2018 | Lee et al. |
| 2019/0261519 | A1 | 8/2019 | Park et al. |
| 2019/0278324 | A1 | 9/2019 | Yoon et al. |
| 2020/0264660 | A1 | 8/2020 | Song et al. |
| 2020/0371558 | A1 | 11/2020 | Kim et al. |
| 2021/0029452 | A1* | 1/2021 | Tsoi ..................... H04L 65/60 |
| 2021/0135151 | A1 | 5/2021 | Baek et al. |
| 2021/0219437 | A1 | 7/2021 | Kim et al. |

FOREIGN PATENT DOCUMENTS

| | | |
|---|---|---|
| JP | 2006-157199 A | 6/2006 |
| JP | 3788889 B2 | 6/2006 |
| JP | 2006-279841 A | 10/2006 |
| JP | 2012-034120 A | 2/2012 |
| JP | 5609384 B2 | 10/2014 |
| KR | 10-2010-0052898 A | 5/2010 |
| KR | 10-2013-0045107 A | 5/2013 |
| KR | 10-2015-0051773 A | 5/2015 |
| KR | 10-2015-0084159 A | 7/2015 |
| KR | 10-2016-0122388 A | 10/2016 |
| KR | 10-2017-0023481 A | 3/2017 |
| KR | 10-2017-0048007 A | 5/2017 |
| KR | 10-1975435 B1 | 5/2019 |
| KR | 10-2019-0086305 A | 7/2019 |
| KR | 10-2019-0091711 A | 8/2019 |
| KR | 10-2019-0101184 A | 8/2019 |
| KR | 10-2019-0143029 A | 12/2019 |
| KR | 10-2020-0101263 A | 8/2020 |
| WO | 03/030518 A1 | 4/2003 |

OTHER PUBLICATIONS

Korean Notice of Patent Grant dated Feb. 27, 2025, issued in Korean Patent Application No. 10-2021-0046040.
Extended European Search Report dated Dec. 19, 2023, issued in European Patent Application No. 21894984.0.
International Search Report dated Mar. 2, 2022, issued in International Application No. PCT/KR2021/016174.
European Office Action dated Apr. 17, 2025, issued in European Application No. 21894984.0.
Indian Hearing Notice dated Nov. 13, 2025, issued in Indian Application No. 202317028095.

* cited by examiner

FIG.11A (First State)
FIG.11B (Second State)
FIG.11C (Third State)

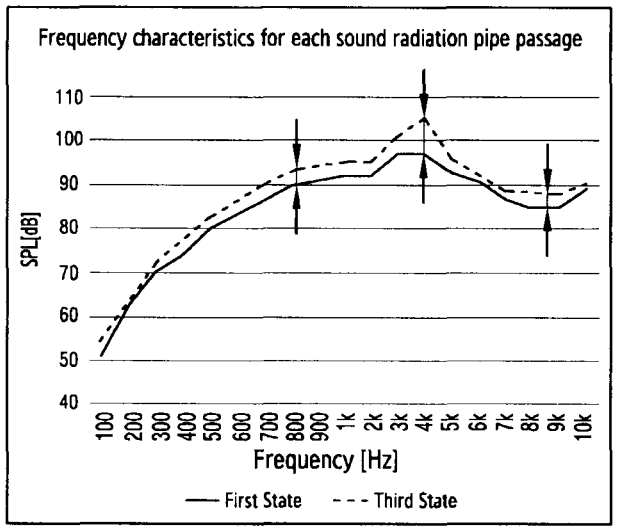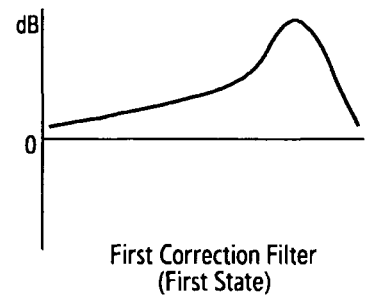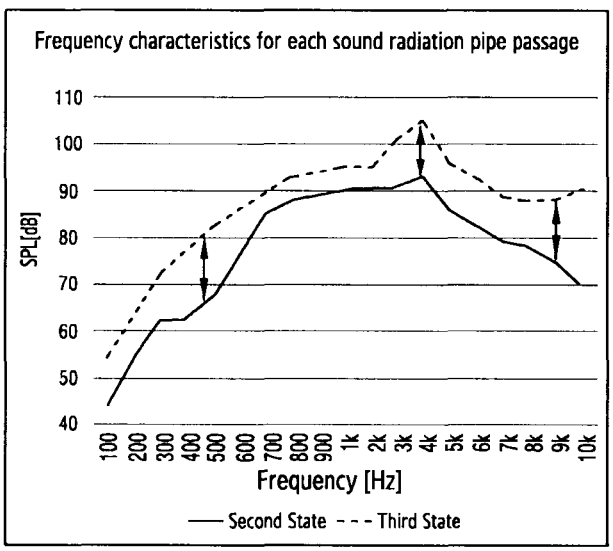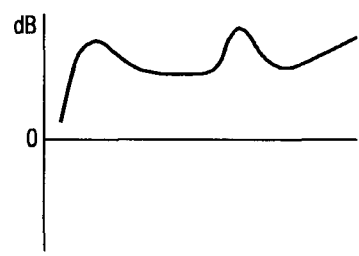
FIG.13

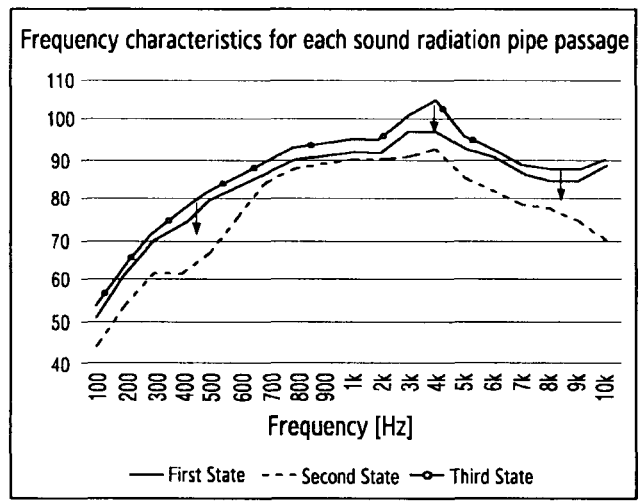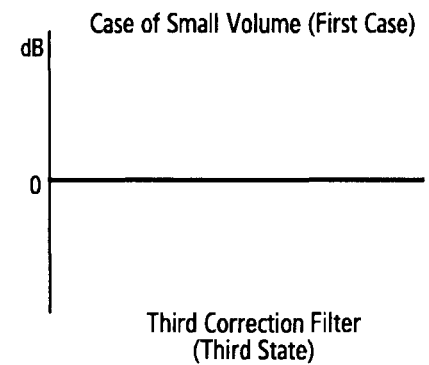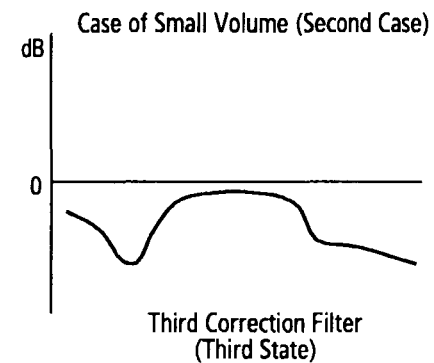
FIG.14

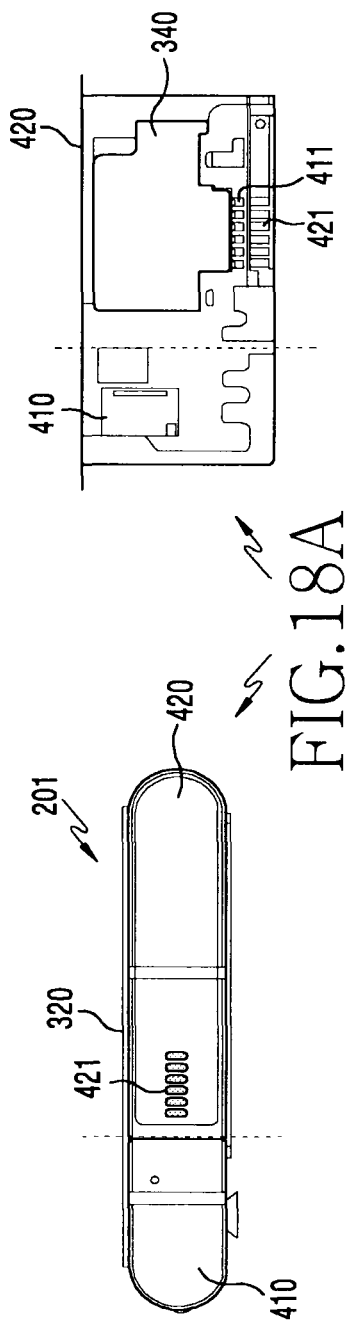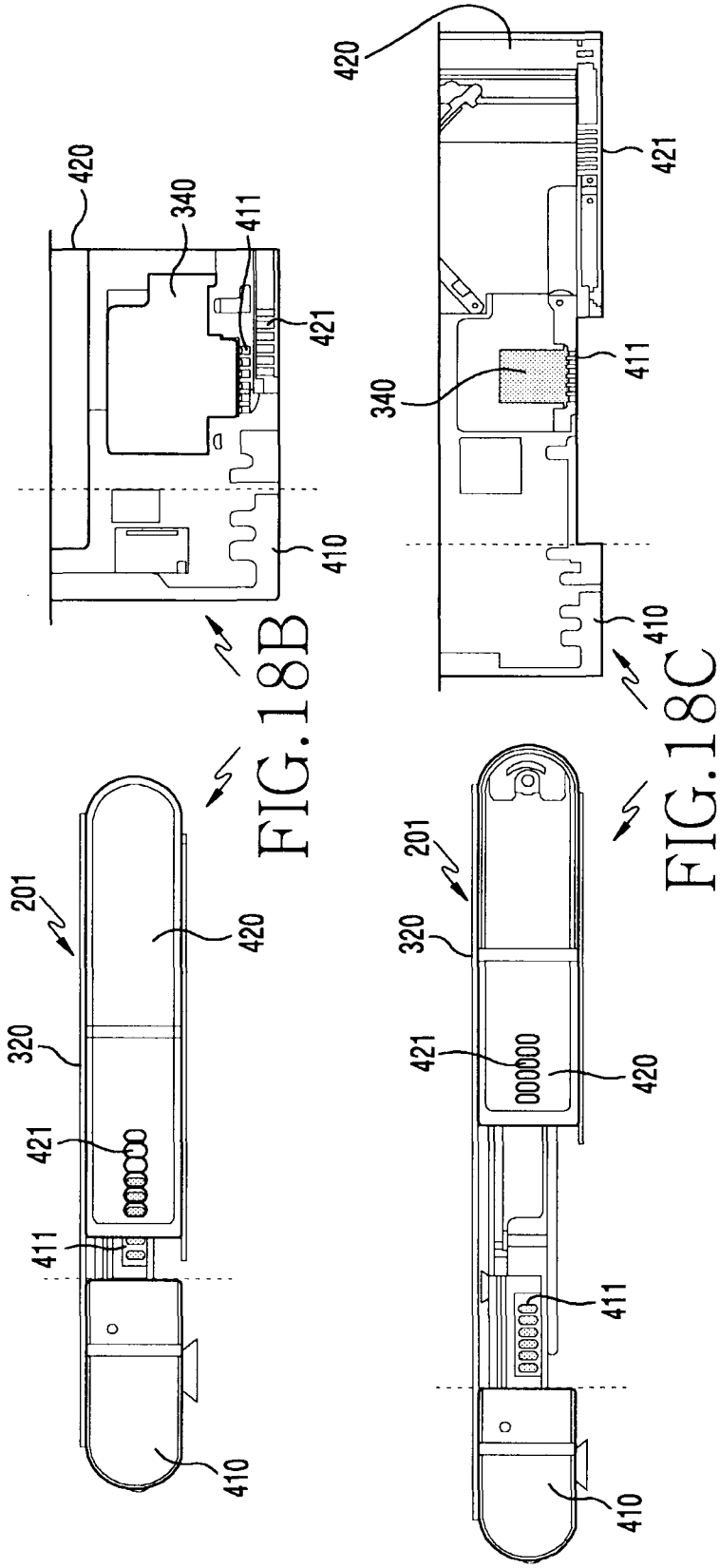

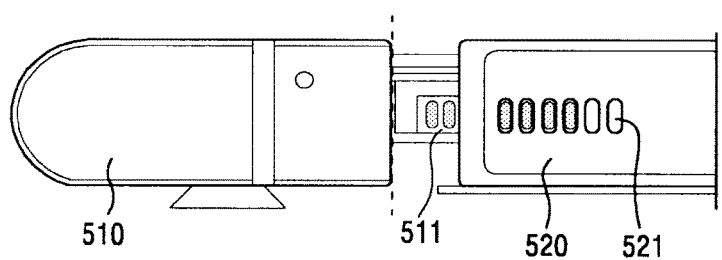
FIG.20A
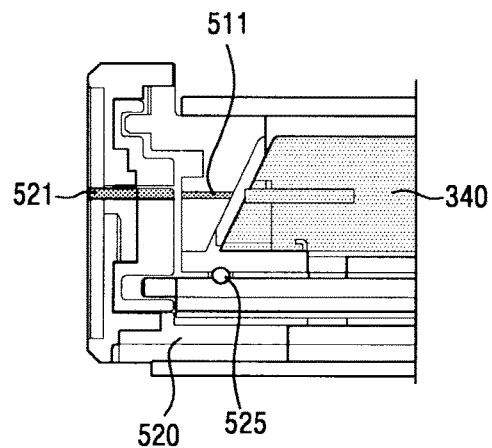
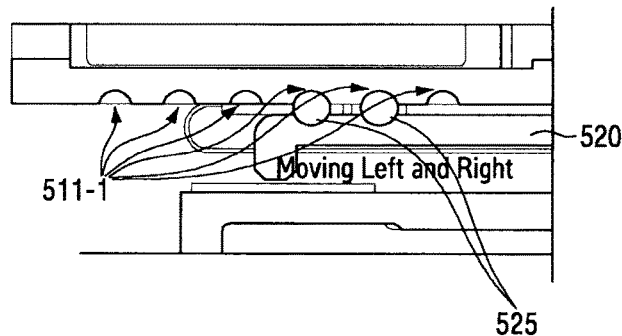
FIG.20B  FIG.20C

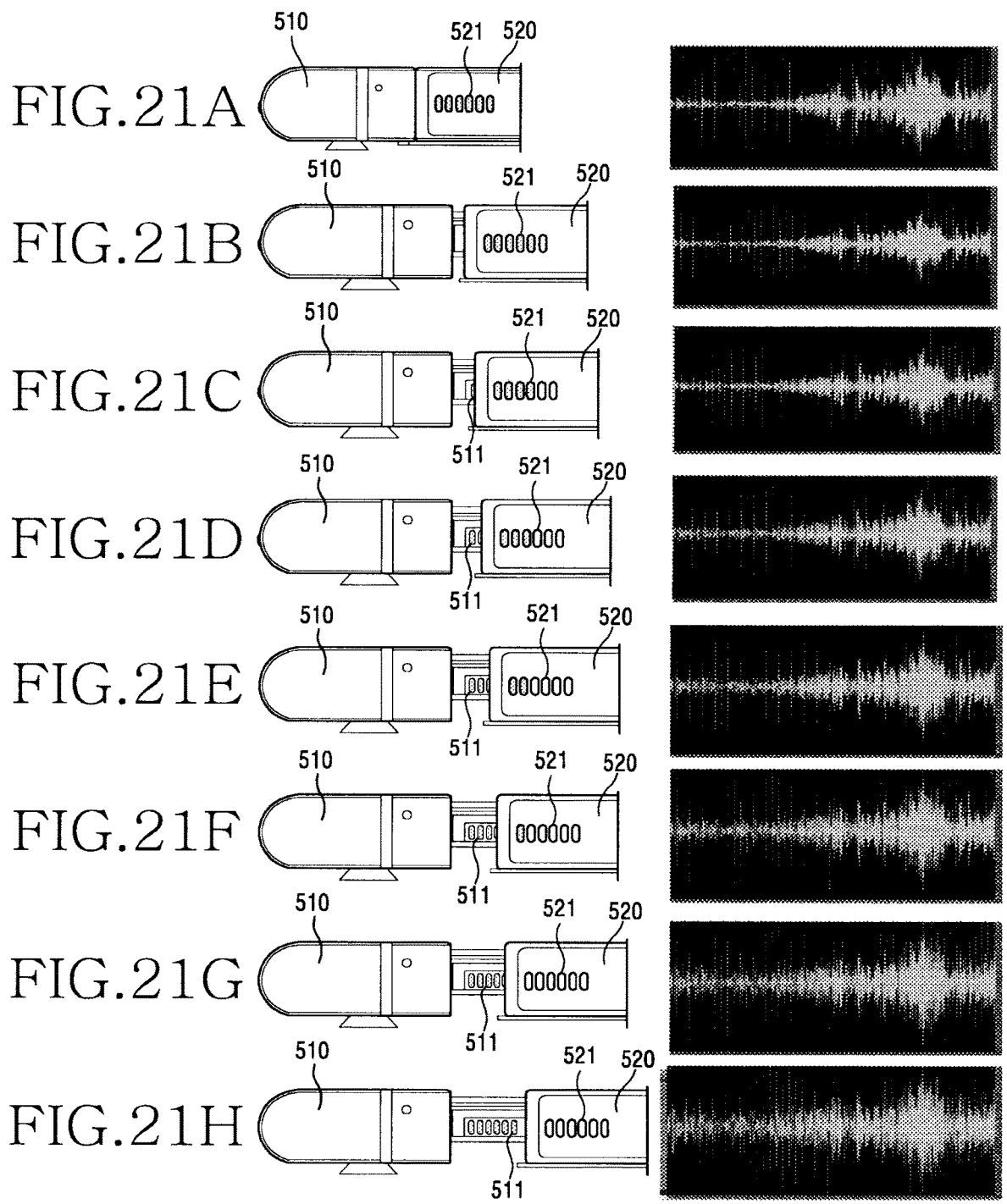

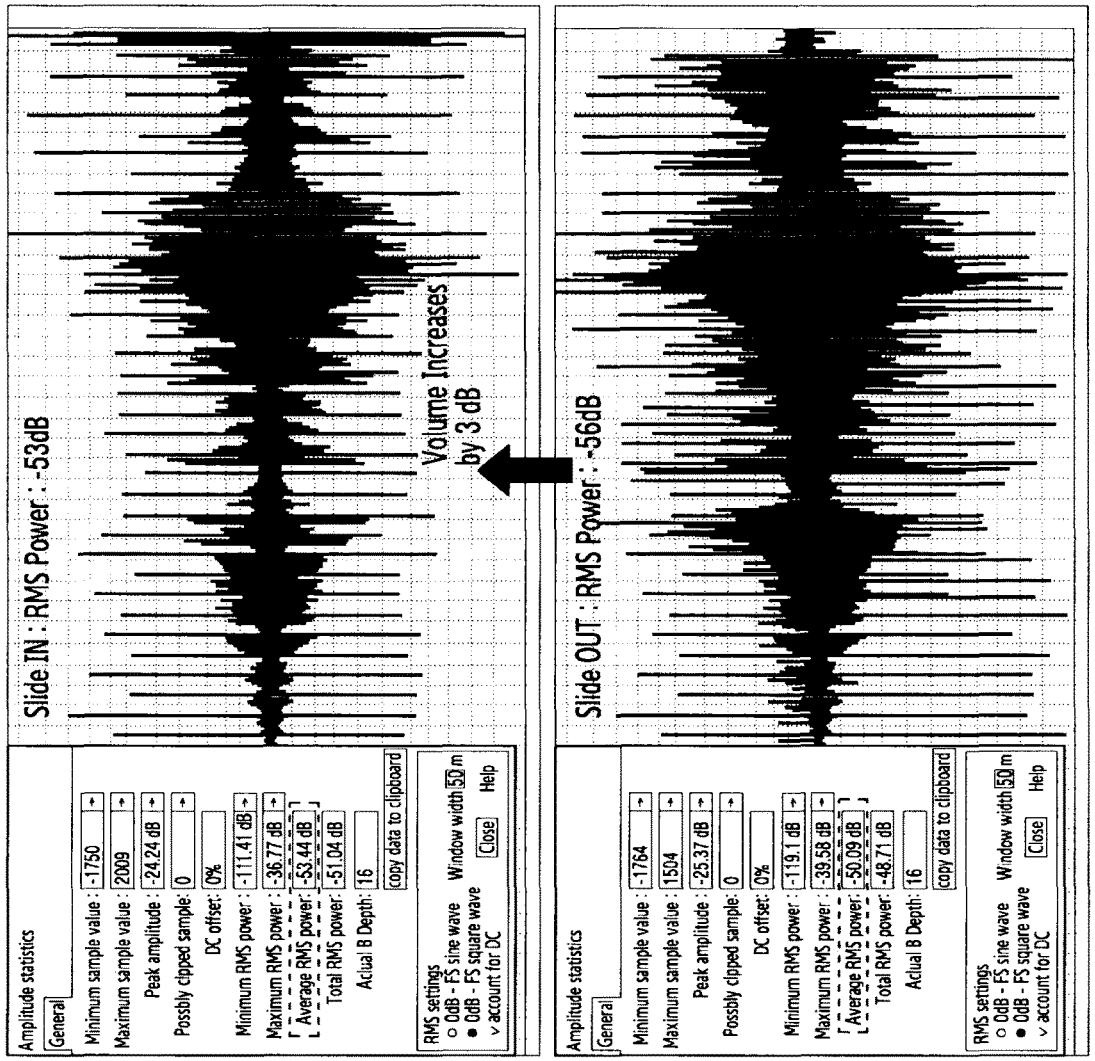
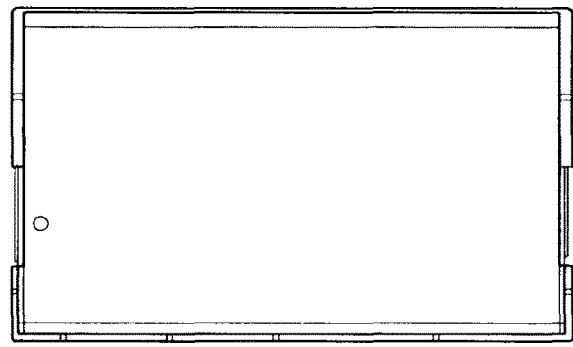
FIG. 25

ELECTRONIC DEVICE COMPRISING SPEAKER AND OPERATION METHOD OF SAME

CROSS-REFERENCE TO RELATED APPLICATION(S)

This application is a continuation application, claiming priority under § 365(c), of an International application No. PCT/KR2021/016174, filed on Nov. 9, 2021, which is based on and claims the benefit of a Korean patent application number 10-2020-0154071, filed on Nov. 17, 2020, in the Korean Intellectual Property Office, and of a Korean patent application number 10-2021-0046040, filed on Apr. 8, 2021, in the Korean Intellectual Property Office the disclosure of each of which is incorporated by reference herein in its entirety.

BACKGROUND

1. Field

The disclosure relates to an electronic device which forms a plurality of sound radiation pipe passages corresponding to one speaker and provides an audio signal optimized according to the movement of the plurality of sound radiation pipe passages.

2. Description of Related Art

In general, an electronic device includes an audio module such as a speaker for providing sound services to a user, and the audio module is fixed to an internal space of the electronic device.

One of the main purposes of an audio module such as a speaker is to provide sound services to a user outside of an electronic device, and thus a sound radiation pipe passage is formed to radiate high-quality sound to the outside through the speaker.

As a technology related to this, when sound is radiated through a speaker in an electronic device having a sound device, a single sound radiation pipe passage fixed to one speaker is formed to reflect the characteristics of the fixed radiation pipe passage and provide good sound quality to an external user of the electronic device.

The above information is presented as background information only to assist with an understanding of the disclosure. No determination has been made, and no assertion is made, as to whether any of the above might be applicable as prior art with regard to the disclosure.

SUMMARY

According to the prior art, only a device having a single speaker and a single sound radiation pipe passage fixed at a position corresponding thereto has been considered, and thus applying the prior art to electronic devices having various shapes and which changes in shape may be difficult. For example, an electronic device having a flexible or rollable display may require one or more sound radiation pipe passages for one speaker depending on the degree of display expansion, but the prior art may not adequately meet this requirement.

According to the prior art, a simple change in a sound radiation pipe passage may affect the characteristics of an audio signal passing through a corresponding pipe passage, and accordingly, sound quality may continue to change according to the change in the sound radiation pipe passage.

According to the prior art, optimal sound quality may not be provided to users of electronic devices having various shapes and which changes in shapes.

Aspects of the disclosure are to address at least the above-mentioned problems and/or disadvantages and to provide at least the advantages described below. Accordingly, an aspect of the disclosure is to provide an electronic device which forms a plurality of sound radiation pipe passages corresponding to one speaker and provides an audio signal optimized according to the movement of the plurality of sound radiation pipe passages.

Additional aspects will be set forth in part in the description which follows and, in part, will be apparent from the description, or may be learned by practice of the presented embodiments.

In accordance with an aspect of the disclosure, an electronic device is provided. The electronic device includes a first housing and a second housing coupled to the first housing to be movable with respect to the first housing, a speaker disposed in the first housing to output an audio signal, a flexible display having at least a part disposed in the first housing and the second housing, the flexible display having an expandable area, which is visually exposed to the front of the electronic device, a first pipe passage formed in the first housing to allow the audio signal to be output to the outside of the first housing, a second pipe passage, in a state where a movement distance of the second housing is in a first range, a third pipe passage, in a state where the movement distance of the second housing is in a second range, connected to the first pipe passage, and a processor operatively connected to the speaker and the flexible display, wherein the processor is configured to detect the movement distance of the second housing with respect to the first housing, and correct the characteristics of the audio signal produced from the speaker based on the detected movement distance.

In accordance with another aspect of the disclosure, an electronic device is provided. The electronic device includes a first housing and a second housing coupled to the first housing to be movable with respect to the first housing, a speaker included in the first housing to output an audio signal, a flexible display disposed in the first housing and the second housing and movable along the second housing, a first pipe passage formed in the first housing to allow the audio signal to be output to the outside of the second housing, a second pipe passage, in a state where a movement distance of the flexible display with respect to the first housing is in a first range, formed at a position corresponding to the first pipe passage and formed in the second housing to allow the audio signal to be output to the outside of the electronic device, and a processor operatively connected to the speaker and the flexible display, wherein the processor is configured to detect a movement distance of the flexible display with respect to the first housing, and correct the characteristics of the audio signal produced from the speaker based on a pipe passage state according to the detected movement distance.

According to various embodiments of the disclosure, as a shape of an electronic device changes, a shape of a sound radiation pipe passage of an audio module such as a speaker may also change, and thus optimal sound service may be provided to users via a structure which adapts to changes in shape.

According to various embodiments of the disclosure, by pre-storing the audio characteristics corresponding to the shape of a sound radiation pipe passage according to the shape of an electronic device to be changed and applying a supplementation of the characteristics of an audio signal in advance, the same quality of audio output may be provided to users even when the sound radiation pipe passage is changed.

According to various embodiments of the disclosure, by supplementing the characteristics of an audio signal step by step, a sudden change in sound quality may be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a graph showing characteristics of first and second correction filters for correcting characteristics of an audio signal corresponding to a pipe passage state, according to an embodiment of the disclosure;

FIG. 14 is a graph showing characteristics of a third correction filter for correcting characteristics of an audio signal corresponding to a pipe passage state differently according to case 1 and case 2, according to an embodiment of the disclosure;

FIGS. 18A, 18B, and 18C are views showing shapes in which a display of an electronic device including a speaker moves (expands), according to various embodiments of the disclosure;

FIGS. 20A, 20B, and 20C are views showing a movement (or expansion) of a display of an electronic device including a speaker from various aspects, according to various embodiments of the disclosure;

FIGS. 21A, 21B, 21C, 21D, 21E, 21F, 21G, and 21H are views specifically showing characteristics of an audio signal according to a movement (or expansion) of a display of an electronic device including a speaker, according to various embodiments of the disclosure;

FIG. 25 is a view showing an operation of an electronic device for a user interface when a display of an electronic device rapidly moves, according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
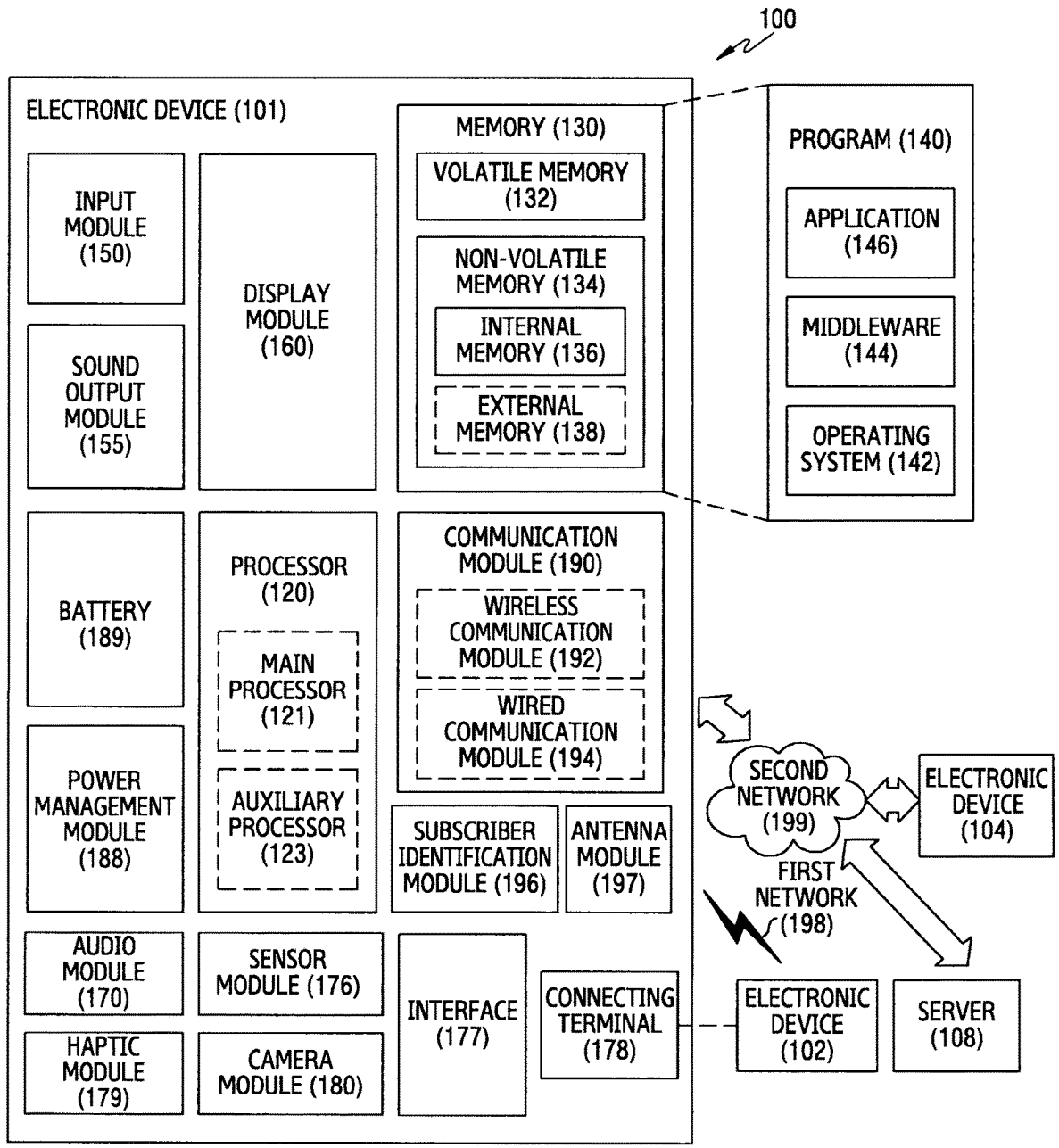
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as a part of another component (e.g., the camera module 180 or the communication module 190) functionally related to the auxiliary processor 123. According to an embodiment, the auxiliary processor (e.g., a neural processing unit (NPU)) may include a hardware structure specific to processing of an artificial intelligence model. The artificial model may be generated through machine learning. For example, this learning may be performed by the electronic device 101 itself where artificial intelligence is executed, and may also be performed through a separate server (e.g., the server 108). A learning algorithm may include, for example, supervised learning, unsupervised learning, semi-supervised learning, or reinforcement learning, but is not limited to the above examples. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep brief network (DBN), a bidirectional recurrent deep neural network (BRDNN), a deep Q-network, and a combination of two or more thereof, but is not limited to the above examples. Additionally or alternatively, the artificial intelligence model may include a software structure, in addition to the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a sensor circuit (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., the external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the external electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support 5G networks and next-generation communication technologies beyond fourth generation (4G) networks, for example, a new radio (NR) access technology. The NR access technology may support enhanced mobile broadband (eMBB), massive machine type communications (mMTC), or ultra-reliable and low-latency communications (URLLC). The wireless communication module 192 may support high-frequency bands (e.g., the millimeter wave (mmWave) band), for example, in order to achieve a high data transfer rate. The wireless communication module 192 may support various technologies for ensuring performance in high-frequency bands, such as beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on or adjacent to a first surface (e.g., the bottom surface) of the printed circuit board and capable of supporting a designated high-frequency band (e.g., the mmWave band), and a plurality of antennas (e.g., an array antenna) disposed on or adjacent to second surface (e.g., the top or side surface) of the printed circuit board and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultralow-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
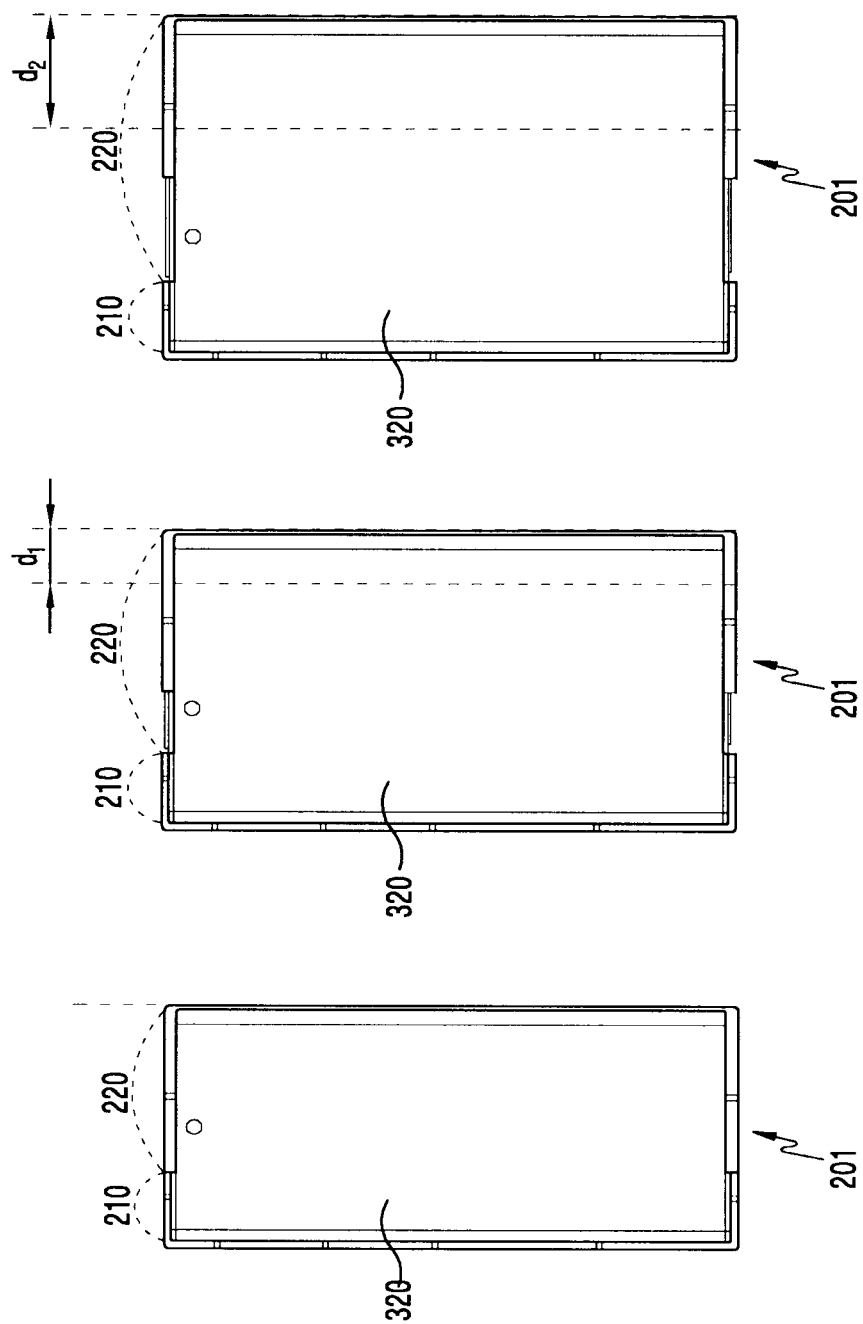
FIGS. 2A, 2B, and 2C are views showing an electronic device including a movable (or expandable) display according to various embodiments of the disclosure.

FIGS. 2A to 2C illustrate an electronic device including a movable (or expandable) display according to various embodiments of the disclosure.

According to an embodiment, an electronic device 201 may correspond to the electronic device 101 described with reference to FIG. 1. For example, the electronic device 201 may include elements which are the same as or similar to the elements included in the electronic device 101.

According to an embodiment, the electronic device 201 may include a first housing 210 and a second housing 220, and a display 320 may be disposed in the first housing 210 and the second housing 220.

According to an embodiment, the display 320 may be a flexible display or a rollable display.

According to an embodiment, the electronic device 201 may include the movable (or expandable) display 320. In an embodiment, the display 320 may be in a state where the display 320 does not move (or expand) as shown in FIG. 2A. In an embodiment, the display 320 may move (or expand) by d1 based on the non-moving state (or non-expanding state) as shown in FIG. 2B. In addition, the display 320 may move (or expand) by d2 based on the non-moving state (or non-expanding state) as shown in FIG. 2C.

According to an embodiment, d2 may be a maximum movement distance of the display 320, and d1 may be an arbitrary distance before the maximum movement of the display 320.

According to an embodiment, the display 320 may move a distance equal to d1 or d2 based on a non-moving state (or non-expanding state), and in this way, in a case where the expansion distance of the display 320 increases, the case may be described as sliding out.

According to an embodiment, the display 320 may change from a state of moving by a distance equal to d1 or d2 to a non-moving state (or non-expanding state), and in this way, in a case where the extension distance of the display 320 decreases, the case may be described as sliding in.

According to an embodiment, the electronic device 201 may include the fixed first housing 210 and the second housing 220 movable with respect to the first housing 210, and the display 320 may move along with the movement of the second housing 220. For example, the display 320 may be disposed on the second housing 220 coupled to be movable with respect to the first housing 210, and the display 320 may move along with the movement of the second housing 220.

In an embodiment, in the description that the display 320 moves, the description that the display 320 expands may be used, which may be conceptually the same as or similar to the movement of the display 320 or the movement of the second housing 220.

Figure 3:
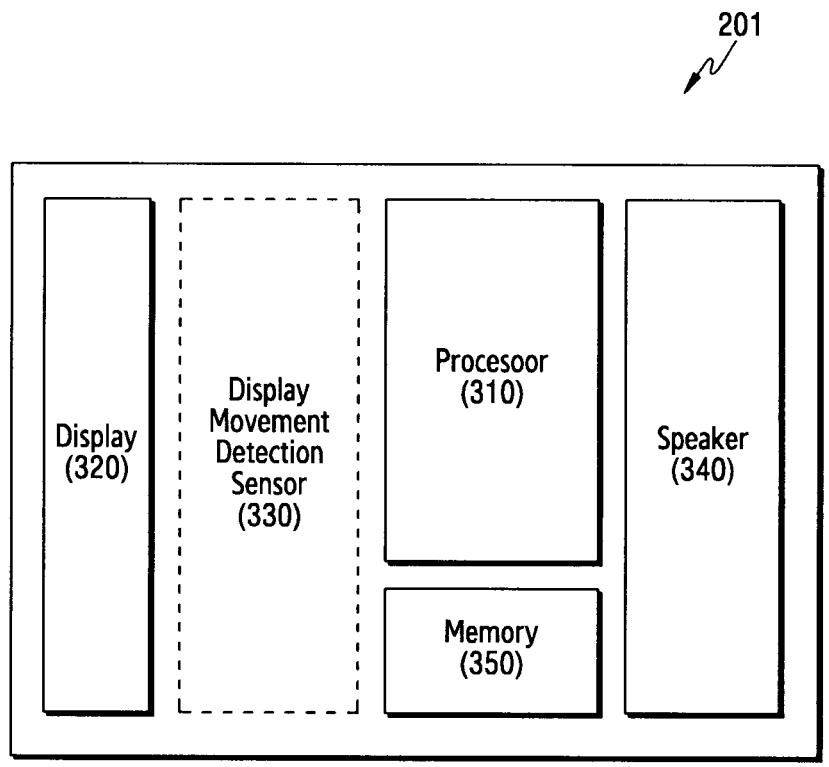
FIG. 3 is a block diagram of an electronic device including a display and a speaker, according to an embodiment of the disclosure.

FIG. 3 is a block diagram of an electronic device including a display and a speaker, according to an embodiment of the disclosure.

According to an embodiment, an electronic device 201 may include a processor 310, a display 320, a speaker 340, and a memory 350.

In an embodiment, the processor 310 may be operatively coupled to the display 320, the speaker 340, and the memory 350, and control operations performed by the respective elements.

In an embodiment, the processor 310, the display 320, the speaker 340, and the memory 350 of the electronic device 201 may correspond to the processor 120, the display module 160, the audio module, and the memory 130 of the electronic device 101 described with reference to FIG. 1, respectively. For example, the processor 310 the display 320, the speaker 340, and the memory 350 may perform the functions and operations performed by the processor 120, the display module 160, the audio module 170, and the memory 130 of the electronic device 101, respectively.

According to an embodiment, the memory 350 may store information on the movement (or expansion) distance and movement state of the display 320.

According to an embodiment, the processor 310 may identify a movement (or expansion) distance and a pipe passage state corresponding to a movement state of the display 320.

According to an embodiment, the electronic device 201 may further include a display movement detection sensor 330.

In an embodiment, the display movement detection sensor 330 may detect the movement of the display 320. For example, the display movement detection sensor 330 may detect the movement (or expansion) distance and movement state of the display 320. As another example, in detecting the movement of the display 320, the display movement detection sensor 330 may be based on a magnet and a Hall sensor, be based on wire and resistance sensing, be based on an optical sensor, or be based on capacitance.

In an embodiment, the display movement detection sensor 330 may detect the movement of the second housing 220. For example, the electronic device 201 may detect the movement (or expansion) distance and movement state of the second housing 220 by using the display movement detection sensor 330 under the control of the processor 310. For example, the electronic device 201 may detect the movement (or expansion of the display 320) distance and movement state (or expansion state) of the second housing 220 with respect to the first housing by using the display movement detection sensor 330 under the control of the processor 310.

In an embodiment, the processor 310 may be operatively coupled to the display movement detection sensor 330, and control the operations performed by the display movement detection sensor 330.

Figure 4C:
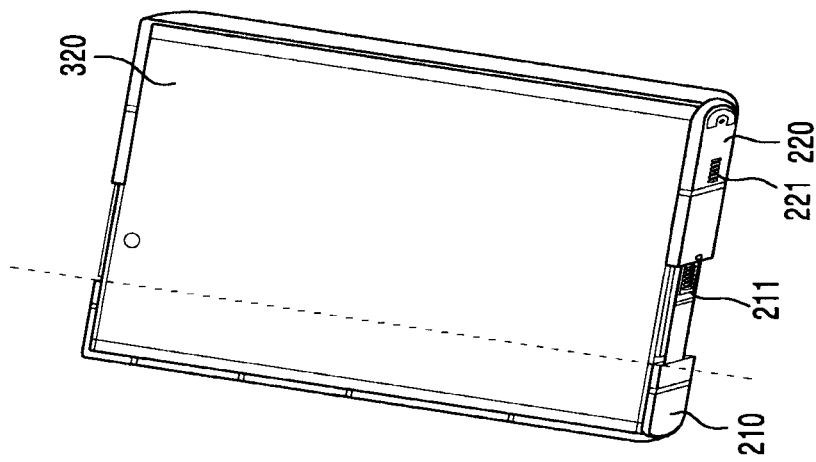
FIGS. 4A, 4B, and 4C are views showing how a display of an electronic device including a speaker moves (or expands), according to various embodiments of the disclosure.
Figure 4B:
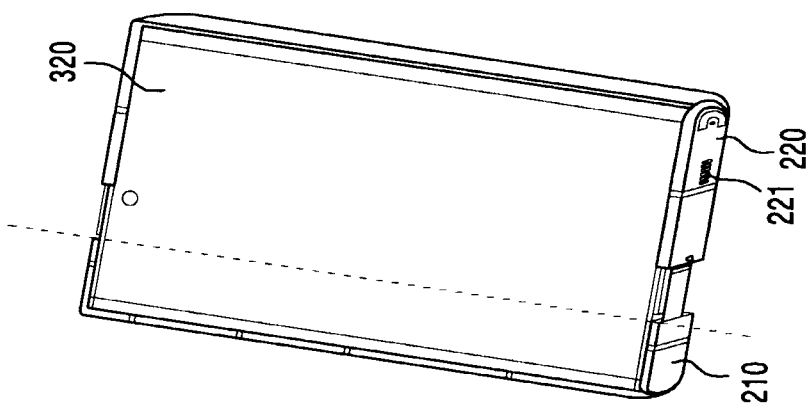
Figure 4A:
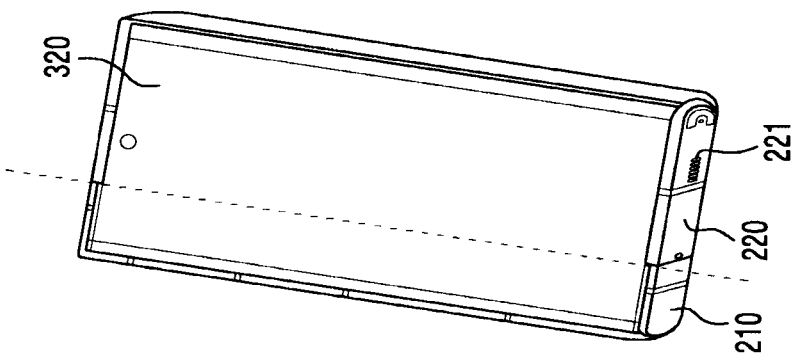

FIGS. 4A to 4C are a view showing how a display of an electronic device including a speaker moves (or expands), according to various embodiments of the disclosure.

Referring to FIGS. 4A to 4C, FIGS. 4A to 4C show changes according to the expansion degree of the display step by step.

In an embodiment, FIG. 4A shows a state where the display 320 does not move (or expand). In addition, FIG. 4A shows a state where the second housing 220 does not move (or expand) with respect to the first housing 210.

In an embodiment, referring to FIG. 4A, an electronic device 201 may include a first housing 210 and a second housing 220 coupled to the first housing 210 to be movable with respect to the first housing 210. In an embodiment, the first housing 210 of the electronic device 201 may be a fixed housing. For example, when the display 320 moves or expands, at least a part of the second housing 220 may move along with the display 320 and the first housing 210 may be fixed and not move.

In an embodiment, a pipe passage (e.g., a first pipe passage 211) may be formed in the first housing 210 to output (or radiate) an audio signal (or sound) produced from a speaker (e.g., the speaker 340) in the electronic device 201 to the outside of the first housing 210. For example, a first pipe passage 211 may be a pipe passage through which an audio signal produced from the speaker 340 is output to the outside of the first housing 210. The first pipe passage 211 may be described as a pipe passage for radiating sound from the speaker 340.

In an embodiment, the first pipe passage 211 may be formed at one side of the first housing 210. For example, the first pipe passage 211 may be formed at one side of the first housing 210, and be formed at a lower side of the first housing 210 as shown in FIG. 4C.

In an embodiment, a second pipe passage 221 may be formed in the second housing 220 to output an audio signal (or sound) produced from a speaker (e.g., the speaker 340) to the outside of the second housing 220. For example, in a state where the display 320 does not expand as shown in FIG. 4A, an audio signal or sound produced from the speaker 340 may pass through the first pipe passage 211, be output to the outside of the first housing 210, and be output through the second pipe passage 221 to the outside of the second housing 220.

In an embodiment, in a state where the display 320 does not move, the second pipe passage 221 may be formed at a position (e.g., a position of the second housing 220 corresponding to the first pipe passage 211) corresponding to the first pipe passage 211. For example, in a state where the display 320 does not move, the second pipe passage 221 may be formed at a position where a cross-section of the second pipe passage 221 and a cross-section of the first pipe passage 211 at least partially overlap each other. As another example, a position of the second pipe passage 221 in FIG. 4A may correspond to a position of the first pipe passage 211 in FIG. 4C.

In an embodiment, even in a state where the display 320 moves by a predetermined distance as shown in FIG. 4B, a cross-section of the second pipe passage 221 and a cross-section of the first pipe passage 211 may at least partially overlap each other according to the movement distance. In an embodiment, in a state where the display 320 moves by a predetermined distance or more, the cross-section of the second pipe passage 221 and the cross-section of the first pipe passage 211 may not overlap each other in at least a part of the cross-sections.

In an embodiment, FIGS. 4A to 4C show an external structure of the electronic device 201, but an internal pipe passage (e.g., a third pipe passage 222) may be formed inside the electronic device 201 to output an audio signal of the speaker 340 to the outside. For example, a third pipe passage 222 distinguished from the first pipe passage 211 and the second pipe passage 221 may be formed inside the second housing 220, and the third pipe passage 222 may be a radiation pipe passage for outputting an audio signal or sound of the speaker 340 to the outside of the second housing 220.

In an embodiment, an audio signal output from the speaker 340 in a state where the display 320 does not expand may pass through the first pipe passage 211 and the second pipe passage 221 and be output (or radiated) to the outside of the electronic device 201. For example, an audio signal or sound of the speaker 340 may be output through the first pipe passage 211 to the outside of the first housing 210, and the output audio signal or sound may be output through the second pipe passage 221 to the outside of the second housing 220.

In an embodiment, even in a state where the display 320 expands, an audio signal output from the speaker 340 may pass through the first pipe passage 211 and the second pipe passage 221 and be output (or radiated) to the outside of the electronic device 201. For example, an audio signal or sound of the speaker 340 may be output through the first pipe passage 211 to the outside of the first housing 210, and at least a part of the audio signal or sound output to the outside of the first housing 210 may pass through the second pipe passage 221 and be output to the outside of the second housing 220.

In an embodiment, an audio signal output from the speaker 340 in a state where the display 320 expands by a predetermined distance or more may pass through the first pipe passage 211 and the third pipe passage 222 and be output (or radiated) to the outside of the second housing 220 (or the electronic device 201). For example, an audio signal or sound of the speaker 340 may be output through the first pipe passage 211 to the outside of the first housing 210, and the output audio signal or sound may be output through the third pipe passage 222 to the outside of the second housing 220.

Figure 5A:
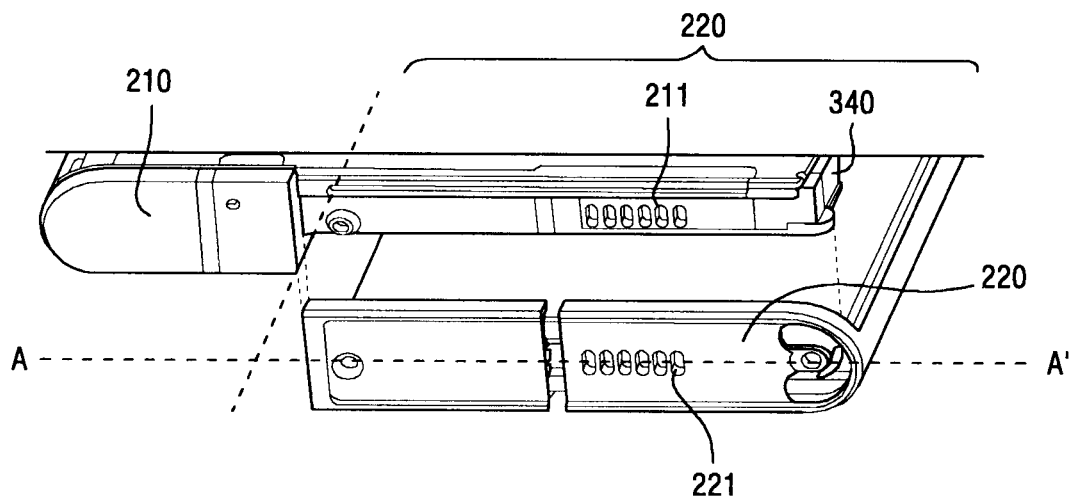
FIGS. 5A and 5B are views showing a structure in a state where a display of an electronic device including a speaker does not move, according to various embodiments of the disclosure.
Figure 5B:
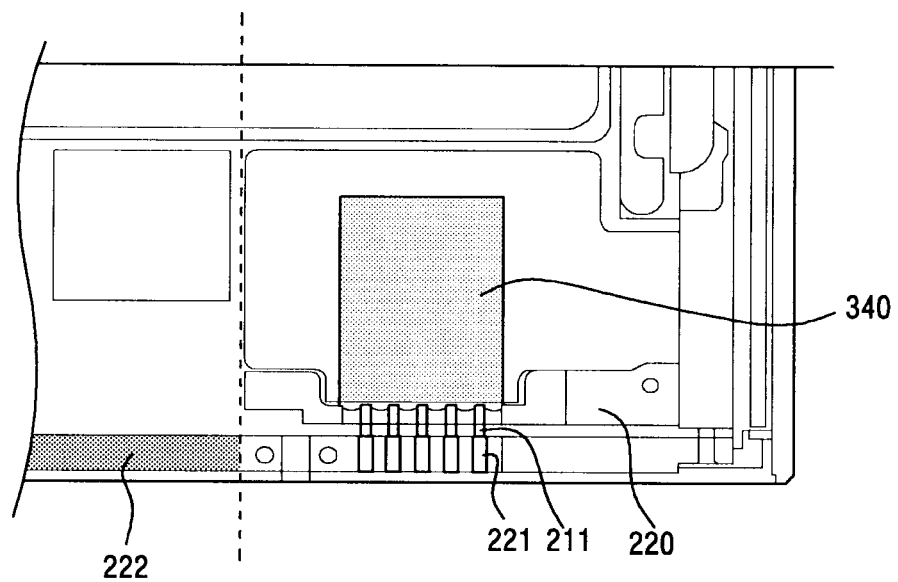

FIGS. 5A and 5B show a structure in a state where a display of an electronic device including a speaker does not move, according to various embodiments of the disclosure. Specifically, FIGS. 5A and 5B show a perspective view and a cross-sectional view of an electronic device including a speaker.

The first housing 210 and the second housing 220 of FIGS. 5A and 5B show a separated state before coupling for convenience of explanation. In addition, the cross-sectional view is a view of the electronic device 201 in the perspective view cut along line A-A'.

In an embodiment, an electronic device 201 may include a first housing 210 and a second housing 220, the second housing 220 may be coupled to the first housing 210 to be movable or expandable with respect to the first housing 210.

In an embodiment, a speaker 340 may be included in the first housing 210, and a first pipe passage 211 may be formed in the first housing 210. For example, the speaker 340 may be disposed at a lower portion of the first housing 210 for smooth output of an audio signal or sound, but may not be limited thereto. As another example, the first pipe passage 211 may be formed in an inner housing of a lower side of the first housing 210, but may not be limited thereto.

In an embodiment, the first pipe passage 211 may be formed at a position of the first housing 210 corresponding to a position where the speaker 340 is disposed. For example, the speaker 340 may be disposed at a lower portion of the first housing 210, and the first pipe passage 211 may be formed in the first housing 210 corresponding to a position where the speaker 340 is disposed.

In an embodiment, a second pipe passage 221 distinguished from the first pipe passage 211 may be formed in the second housing 220. For example, the second pipe passage 221 may be formed at a lower side of the second housing 220 corresponding to a position where the first pipe passage 211 of the first housing 210 is formed. In addition, the second pipe passage 221 may be formed in a shape where at least a part of a lower side of the second housing 220 extends therethrough.

In an embodiment, a third pipe passage 222 distinguished from the first pipe passage 211 and the second pipe passage 221 may be formed in the second housing 220. For example, the third pipe passage 222 may be formed at a lower side of the second housing 220. As another example, the third pipe passage 222 may be formed to be spaced a predetermined distance apart from the second pipe passage 221. The third pipe passage 222 may have a shape of a linear hole formed along a lower side of the second housing 220.

In an embodiment, the first pipe passage 211, the second pipe passage 221, and the third pipe passage 222 may be formed in a shape of a hole to output an audio signal or sound. For example, the first pipe passage 211 may have a shape of multiple holes, which extend through at least a part of a lower side of the first housing 210, and the second pipe passage 221 and the third pipe passage 222 may be formed in a shape of multiple holes, which extend through at least a part of a lower side of the second housing 220. As another example, the first pipe passage 211, the second pipe passage 221, and the third pipe passage 222 may also be formed in a shape of a single hole.

Figure 6:
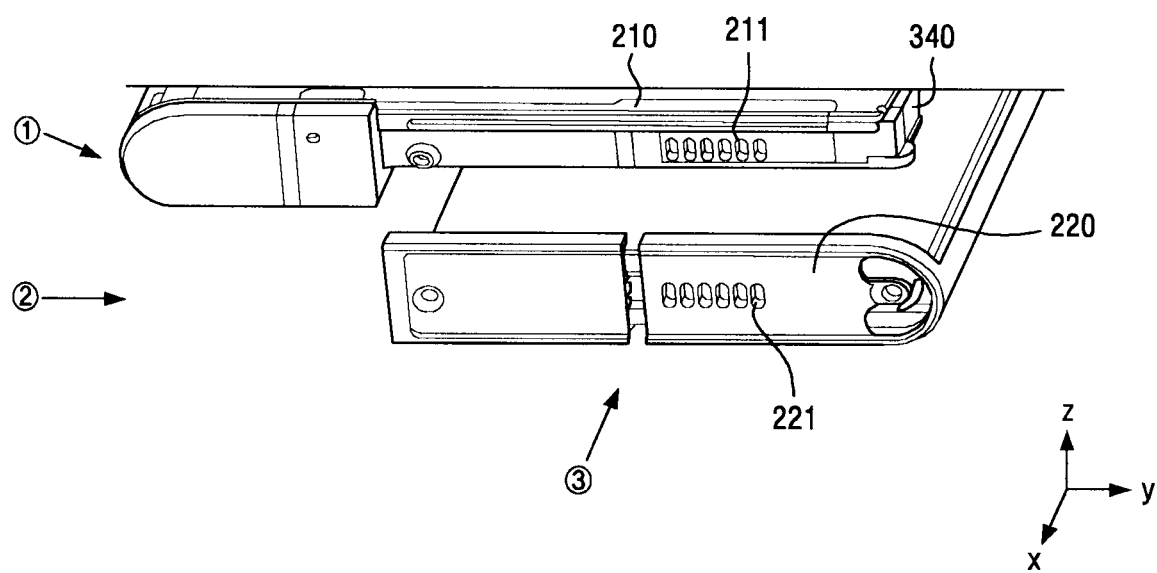
FIG. 6 is a view for describing a structure when viewed in ①, ②, and ③ directions in a state where a display of an electronic device including a speaker does not move, according to an embodiment of the disclosure.

FIG. 6 shows a structure when viewed in ①, ②, and ③ directions in a state where a display of an electronic device including a speaker does not move, according to an embodiment of the disclosure. The structure of an electronic device 201 of FIG. 6 may correspond to the structure described with reference to FIGS. 5A and 5B.

Detailed descriptions on the first pipe passage 211, the second pipe passage 221, and the third pipe passage 222 according to an embodiment will be made with reference to FIGS. 7 to 9 based on FIG. 6.

Referring to FIG. 6, ① direction indicates a direction when the lower structure of the electronic device 201 is viewed from above the diagonal (e.g., when viewed from the +z direction to the +y direction), ② direction indicates a direction when the lower structure of the electronic device 201 is viewed from the left side surface (e.g., when viewed from the −y direction to the +y direction), and ③ direction indicates a direction when the lower structure of the electronic device 201 is viewed from the front surface (e.g., when viewed from the +x direction to the −x direction).

Figure 7:
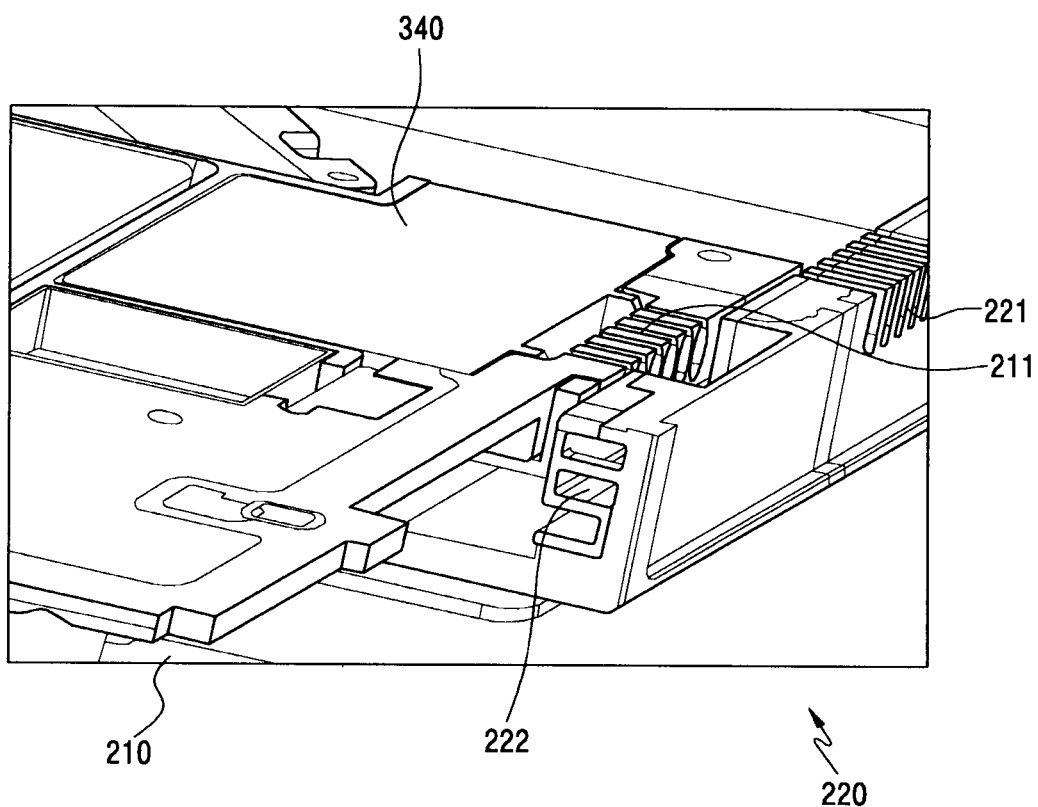
FIG. 7 is a view showing a structure when viewed in ① direction in a state where a display of an electronic device including a speaker does not move, according to an embodiment of the disclosure.

FIG. 7 shows a structure when viewed in ① direction in a state where a display of an electronic device including a speaker does not move, according to an embodiment of the disclosure.

Referring to FIG. 7, a speaker 340 may be disposed at a lower portion of the electronic device 201 (or the first housing 210). In an embodiment, the first pipe passage 211 may be formed at a lower side of the first housing 210 corresponding to a position where the speaker 340 is disposed. In an embodiment, the second pipe passage 221 may be formed at a position in the second housing 220 corresponding to a position where the first pipe passage 211 is formed. In an embodiment, the first pipe passage 211 and the second pipe passage 221 may be in a shape of multiple holes. In an embodiment, the third pipe passage 222 may be formed at a position spaced a predetermined distance apart from a position where the second pipe passage 221 is formed. In an embodiment, the third pipe passage 222 may be formed along a lower side of the second housing 220, and be formed in a shape of multiple holes or even in a shape of one hole. In an embodiment, the third pipe passage 222 may have a shape of a through-hole which may be connected to the outside of the second housing 220.

Figure 8:
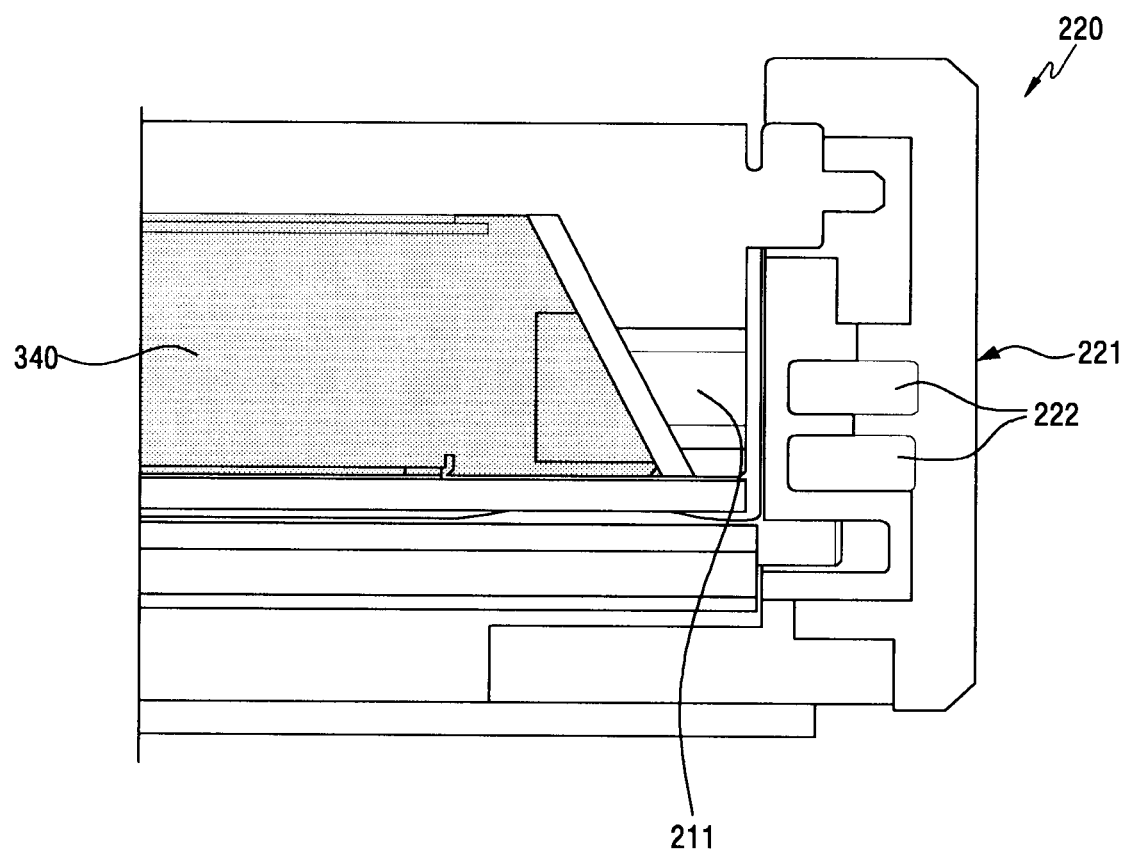
FIG. 8 is a view showing a structure when viewed in ② direction in a state where a display of an electronic device including a speaker does not move, according to an embodiment of the disclosure.

FIG. 8 shows a structure when viewed in ② direction in a state where a display of an electronic device including a speaker does not move, according to an embodiment of the disclosure.

In an embodiment, the speaker 340 may be disposed in the first housing 210, and the first pipe passage 211 may be formed in the first housing 210 corresponding to a position of the speaker 340. The first pipe passage 211 may be formed in the first housing 210, and an audio signal or sound produced from the speaker 340 may pass through the first pipe passage 211 and be output through another pipe passage (e.g., the second pipe passage 221 and the third pipe passage 222) to the outside of the second housing 220.

In an embodiment, the second pipe passage 221 of the second housing 220 may be formed at a position corresponding to the first pipe passage 211. In an embodiment, the second pipe passage 221 may be formed at a position corresponding to the first pipe passage 211 so as to output the audio signal or sound of the speaker 340, which is output through the first pipe passage 211, to the outside of the second housing 220. In an embodiment, the second pipe passage 221 may have a shape of a hole extending through at least a part of a lower side of the second housing 220. In an embodiment, the second pipe passage 221 may be formed at a position corresponding to the first pipe passage 211 in a state where the display 320 does not expand, and thus the second pipe passage may output the audio signal or sound of the speaker 340, which is output through the first pipe passage 221, to the outside of the second housing 220.

In an embodiment, the third pipe passage 222 may have a shape of a hole formed along a lower side of the second housing 220. In an embodiment, the third pipe passage 222 may have a shape of multiple holes, but is not limited thereto. In an embodiment, the third pipe passage 222 may have a shape of a hole which may be connected to the outside of the second housing 220.

Figure 9:
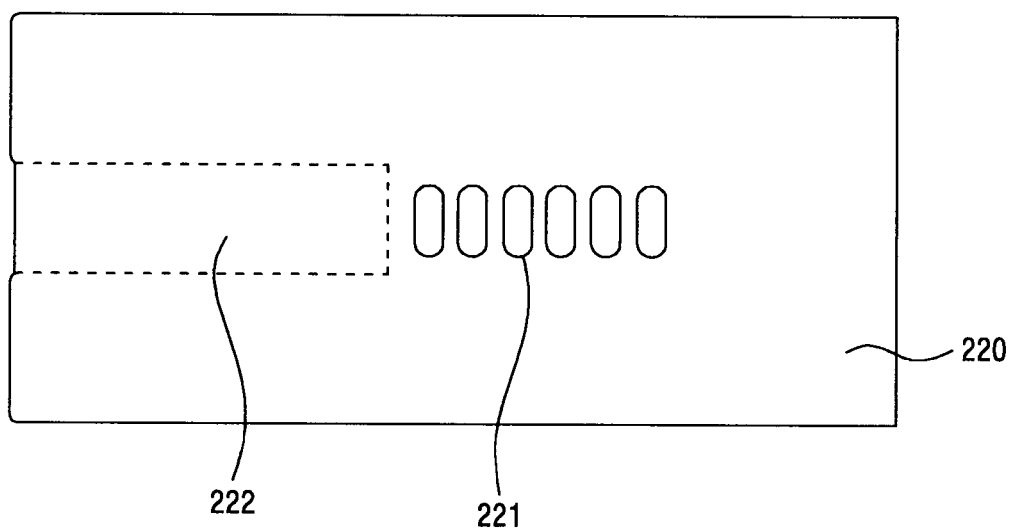
FIG. 9 is a view showing a structure when viewed in ③ direction in a state where a display of an electronic device including a speaker does not move, according to an embodiment of the disclosure.

FIG. 9 shows a structure when viewed in ③ direction in a state where a display of an electronic device including a speaker does not move, according to an embodiment of the disclosure.

In an embodiment, as the second pipe passage 221 is formed in the second housing 220, a plurality of holes may be formed. In an embodiment, the second pipe passage 221 may be formed in a shape of multiple holes extending through the second housing 220.

In an embodiment, though being invisible from the outside of the second housing 220, the third pipe passage 222 may be formed in a shape of a hole along the inner side of the second housing 220. In an embodiment, the third pipe passage 222 may be formed in a shape of multiple holes, and be formed in a shape of one hole. In an embodiment, the third pipe passage 222 may be connected to the outside of the second housing 220.

Figure 10:
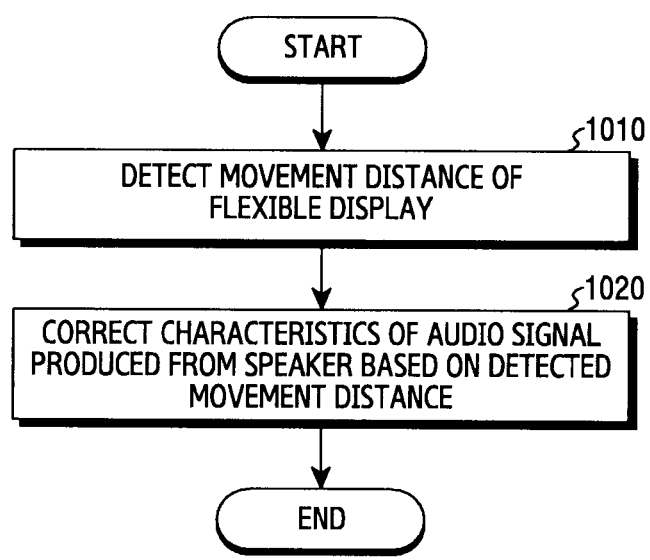
FIG. 10 is a flowchart showing a flow in which an electronic device including a speaker corrects the characteristics of an audio signal according to the movement of a display, according to an embodiment of the disclosure.

FIG. 10 shows a flow in which an electronic device including a speaker corrects the characteristics of an audio signal according to the movement of a display, according to an embodiment of the disclosure.

Figure 11:
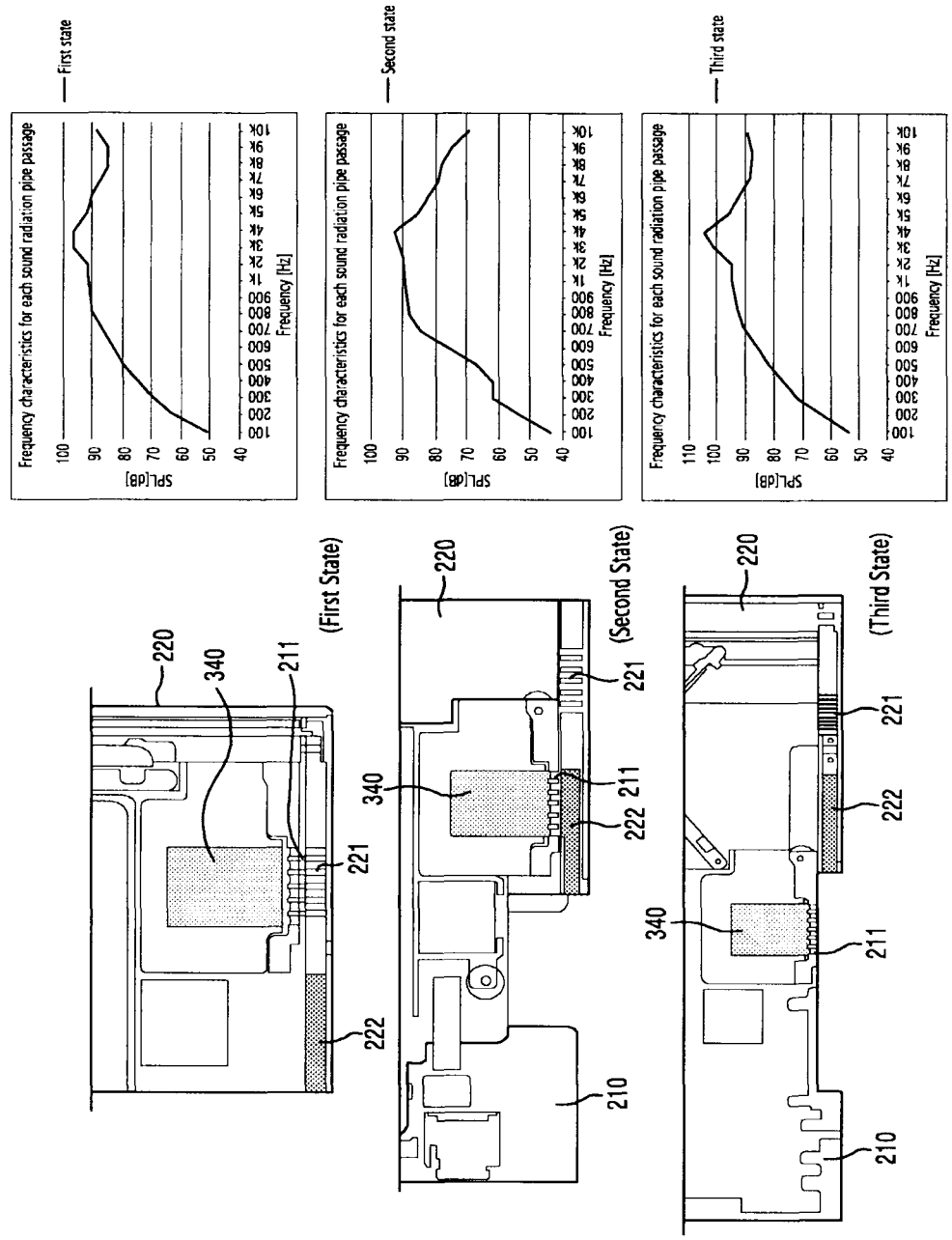
FIGS. 11A, 11B, and 11C are graphs showing characteristics of an audio signal according to a pipe passage state of an electronic device including a speaker in a state where a display moves, according to various embodiments of the disclosure.

The flow in which the electronic device 201 according to FIG. 10 operates will be described with reference to FIGS. 11A to 11C showing an embodiment of the characteristics of an audio signal according to a pipe passage state of an electronic device in which a display moves.

According to an embodiment, in operation 1010, an electronic device 201 may detect a movement distance of a flexible display.

In an embodiment, the display 320 may be a flexible or rollable display. For example, the display 320 may be a flexible display or a rollable display which is bendable by external pressure.

In an embodiment, the electronic device 201 may detect the movement of the display 320 under the control of the processor 310. For example, when the display 320 is moved by a user or the display 320 moves by itself, the electronic device 201 may detect the movement of the display 320 based on the control of the processor 310.

In an embodiment, the processor 310 of the electronic device 201 may detect the movement of the display 320 based on the display movement detection sensor 330. For example, the electronic device 201 may include the display movement detection sensor 330 for detecting the movement of the display 320. The electronic device 201 may detect the movement (e.g., a movement distance) of the display 320 by using the display movement detection sensor 330 under the control of the processor 310.

In an embodiment, referring to FIGS. 11A to 11C, the electronic device 201 may detect the movement of the display 320 according to the movement of the display 320 or the movement of the second housing 220 as shown in FIGS. 11A to 11C under the control of the processor 310. For example, the movement distance of the second housing 220 with respect to the first housing 210 may be greater in FIG. 11B than that in FIG. 11A, and the movement distance of the second housing 220 with respect to the first housing 210 may be greater in FIG. 11C than that in FIG. 11B. As another example, the movement distance (or degree of expansion) of the display 320 in FIG. 11B may be greater than that in FIG. 11A, and the movement distance (or degree of extension) of the display 320 in FIG. 11C may be greater than that in FIG. 11B. By using the control of the processor 310 or the display movement detection sensor 330 under the control of the processor 310, the electronic device 201 may detect the movement distance or degree of expansion of the display 320.

In an embodiment, the electronic device 201 may identify a pipe passage state according to the detected movement distance. In an embodiment, the electronic device 201 may detect the movement distance (or degree of expansion) of the display 320 under the control of the processor 310, and identify a pipe passage state according to the detected movement distance (or degree of expansion). For example, referring to FIGS. 11A to 11C, the electronic device 201 may detect the movement distance (or degree of expansion) of the display 320 as shown in FIGS. 11A to 11C, and identify a pipe passage state (e.g., a first state, a second state, and a third state) according to the detected movement distance (or degree of expansion). Referring to FIG. 11A, the first pipe passage 211 of the electronic device 201 may be connected to the second pipe passage 221. For example, the first pipe passage 211 may be wholly or partially connected to the second pipe passage 221, and may thus be connected to the outside of the second housing 220. As another example, an audio signal or sound produced from the speaker 340 may pass through the first pipe passage 211 and the second pipe passage 221 and be output (or radiated) to the outside of the second housing 220. The pipe passage state of the electronic device 201 in this case may be defined as a first state, and the electronic device 201 may identify the pipe passage state of the first state under the control of the processor 310. Referring to FIG. 11B, the first pipe passage 211 of the electronic device 201 may be connected to the third pipe passage 222. For example, the first pipe passage 211 may be connected to the third pipe passage 222, and thus be connected to the outside of the second housing 220. As another example, an audio signal or sound produced from the speaker 340 may pass through the first pipe passage 211 and the third pipe passage 222 and be output (or radiated) to the outside of the second housing 220. The pipe passage state of the electronic device 201 in this case may be defined as a second state, and the electronic device 201 may identify the pipe passage state of the second state under the control of the processor 310. Referring to FIG. 11C, the first pipe passage 211 of the electronic device 201 may be connected to the outside of the second housing 220 without being connected to the second pipe passage 221 or the third pipe passage 222. For example, the first pipe passage 211 may be connected to the outside of the second housing 220, and thus be output (or radiated) to the outside of the second housing 220 while an audio signal or sound produced from the speaker 340 does not pass through the second pipe passage 221 and/or the third pipe passage 222. The pipe passage state of the electronic device 201 in this case may be defined as a third state, and the electronic device 201 may identify the pipe passage state of the third state under the control of the processor 310.

In an embodiment, when a movement distance of a display (e.g., the display 320) with respect to the first housing 210 is in a predetermined range (e.g., a first range), the pipe passage state may be the first state. For example, the first range may be a range in which the display 320 moves to a distance where the first pipe passage 211 and the second pipe passage 221 finish overlapping each other.

In an embodiment, when a movement distance of a display (e.g., the display 320) with respect to the first housing 210 is in a predetermined range (e.g., a second range), the pipe passage state may be the second state. For example, the second range may be a range in which the display 320 moves to a distance where the first pipe passage 211 starts to overlap the third pipe passage 222 while the first pipe passage 211 and the second pipe passage 221 do not overlap each other.

In an embodiment, when a movement distance of a display (e.g., the display 320) with respect to the first housing 210 is in a predetermined range (e.g., a third range), the pipe passage state may be the third state. For example, the third range may be a range in which the display 320 moves to a distance where the first pipe passage 211 does not overlap the third pipe passage 222 while the first pipe passage 211 and the second pipe passage 221 do not overlap each other.

In an embodiment, the third range may be a range in which the display 320 moves a greater distance with respect to the first housing 210 than the first range and the second range.

In an embodiment, the second range may be a range in which the display 320 moves a greater distance with respect to the first housing 210 than the first range.

According to an embodiment, in operation 1020, the electronic device 201 may correct the characteristics of an audio signal produced from a speaker (e.g., the speaker 340) based on the movement distance of the detected flexible display (e.g., the display 320).

In an embodiment, the electronic device 201 may identify which range the detected movement distance belongs to, under the control of the processor 310. For example, the electronic device 201 may identify, under the control of the processor 310, which of the above-described first range, second range, and third range the detected movement distance belongs to.

In an embodiment, the electronic device 201 may store the characteristics of an audio signal according to an identified range (e.g., a first range, a second range, and a third range) in the memory 350 in advance.

In an embodiment, the electronic device 201 may identify a filter corresponding to the characteristics of an audio signal such as a frequency characteristic graph according to the first to third ranges, under the control of the processor 310. In addition, the processor 310 may correct the characteristics of an audio signal using the identified filter, and thus the electronic device 201 may output the corrected audio signal to the outside of the electronic device 201.

According to another embodiment, under the control of the processor 310, the electronic device 201 may correct the characteristics of an audio signal produced from a speaker based on the identified pipe passage state.

In an embodiment, the electronic device 201 may store the characteristics of an audio signal according to the identified pipe passage state (e.g., a first state, a second state, and a third state) in the memory 350 in advance. For example, the electronic device 201 may identify the pipe passage state as shown in FIG. 11A as a first state, and store the characteristics of an audio signal such as a graph (e.g., a frequency characteristic graph according to a first state) corresponding to FIG. 11A in the memory 350. As another example, the electronic device 201 may identify the pipe passage state as shown in FIG. 11B as a second state, and store the characteristics of an audio signal such as a graph (e.g., a frequency characteristic graph according to a second state) corresponding to FIG. 11B in the memory 350. In addition, the electronic device 201 may identify the pipe passage state as shown in FIG. 11C as a third state, and store the characteristics of an audio signal such as a graph (e.g., a frequency characteristic graph according to a third state) corresponding to FIG. 11C in the memory 350.

In an embodiment, the electronic device 201 may apply a filter according to the characteristics of an audio signal pre-stored in the memory 350, and thus correct the characteristics of the audio signal. For example, the electronic device 201 may identify a filter corresponding to the characteristics of an audio signal such as frequency characteristic graphs according to the first to third states or graphs corresponding to FIGS. 11A to 11C pre-stored in the memory 350. In addition, the electronic device 201 may correct the characteristics of an audio signal using the identified filter, and thus output the corrected audio signal to the outside of the electronic device 201.

In an embodiment, due to the structural characteristics of the electronic device 201, an audio signal or sound according to a third state may be least affected by the output (or radiation) of the audio signal or sound produced from the speaker 340. In an embodiment, an audio signal or sound according to a first state and a second state may be more affected by volume reduction, partial frequency loss, and frequency loss per band due to the structural characteristics of the electronic device 201 than that in the third state.

Figure 12:
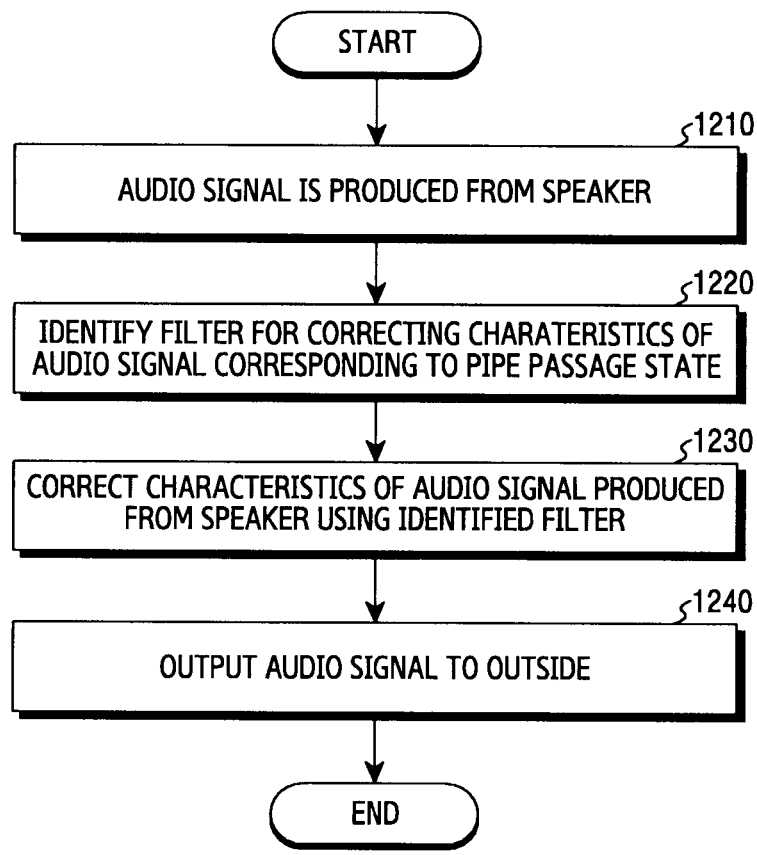
FIG. 12 is a flowchart showing a flow in which an electronic device including a speaker corrects characteristics of an audio signal corresponding to a pipe passage state using a filter, according to an embodiment of the disclosure.

FIG. 12 shows a flow in which an electronic device including a speaker corrects the characteristics of an audio signal corresponding to a pipe passage state using a filter, according to an embodiment of the disclosure.

The description of the flow of operations performed by the electronic device 201 in FIG. 12 will be made with reference to FIG. 13 showing the characteristics of first and second correction filters for correcting the characteristics of the audio signal corresponding to the pipe passage state and FIG. 14 showing the characteristics of a third correction filter for correcting the characteristics of the audio signal corresponding to the pipe passage state differently according to case 1 and case 2.

According to an embodiment, in operation 1210, an audio signal may be produced from the speaker 340 of the electronic device 201.

In an embodiment, the electronic device 201 may include the speaker 340, and an audio signal or sound may be produced from the speaker 340. In an embodiment, pipe passages for outputting (or radiating) an audio signal or sound produced from the speaker 340 to the outside of the electronic device 201 or the outside of the second housing 220 where the speaker 340 is positioned may be formed. In an embodiment, an audio signal or sound of the speaker 340 may be output to the outside through the pipe passages formed in the housings (e.g., the first housing 210 and the second housing 220) of the electronic device 201.

According to an embodiment, in operation 1220, the electronic device 201 may identify a filter for correcting the characteristics of an audio signal corresponding to a pipe passage state.

In an embodiment, the electronic device 201 may identify a movement distance (e.g., first to third ranges) of a display (e.g., the display 320) and/or a pipe passage state (e.g., first to third states) under the control of the processor 310, and each of the movement distance (e.g., first to third ranges) and/or the pipe passage state may have audio characteristics corresponding to the structural characteristics of the electronic device 201. For example, referring to FIGS. 11A to 11C, when compared to the graph corresponding to the third state, the graph corresponding to the first state may include audio characteristics having volume reduction and partial frequency loss. As another example, when compared to the graph corresponding to the third state, the graph corresponding to the second state may include audio characteristics having loss of frequencies in low and high bands.

In an embodiment, the electronic device 201 may store audio characteristics corresponding to each of the movement distance (e.g., first to third ranges) and/or the pipe passage state (e.g., first to third states) under the control of the processor 310. For example, under the control of the processor 310, the electronic device 201 may store audio characteristics such as volume characteristics, frequency characteristics, and frequency characteristics for each band in first to third states (or first to third ranges) in advance in the memory 350.

In an embodiment, the electronic device 201 may identify a correction filter corresponding to a movement distance (e.g., first to third ranges) and/or a pipe passage state (e.g., first to third states) under the control of the processor 310.

In an embodiment, referring to FIG. 13, the electronic device 201 may identify a first correction filter for correcting volume reduction and partial frequency loss in a first state with respect to a third state under the control of the processor 310. The first correction filter may be a filter including an audio characteristic to correct differences in reduced volume and partial frequency loss, compared to an audio characteristic of the third state.

In an embodiment, referring to FIG. 13, the electronic device 201 may identify a second correction filter for correcting frequency loss in low and high bands in a second state with respect to a third state under the control of the processor 310. The second correction filter may be a filter including an audio characteristic to correct the difference in frequency for each band where a loss has occurred, compared to an audio characteristic of the third state.

In an embodiment, the electronic device 201 may identify a third correction filter for correcting the characteristics of an audio signal in a third state which is a reference to correct the difference of audio characteristics of the first correction filter and the second correction filter under the control of the processor 310. The third correction filter may apply different audio characteristics depending on the volume of an audio. For example, when the volume of an audio produced from the speaker 340 is small, sufficient correction is performed by only the first correction filter and the second correction filter, and thus the electronic device 201 may identify a third correction filter which does not affect audio characteristics under the control of the processor 310. As another example, when the volume of an audio produced from the speaker 340 is large, the electronic device may identify a third correction filter which may perform volume reduction and/or frequency level reduction.

According to an embodiment, in operation 1230, the electronic device 201 may correct the characteristics of an audio signal produced from a speaker using the identified filters.

In an embodiment, when the pipe passage state identified under the control of the processor 310 is in the first state, the electronic device 201 may apply the first correction filter to correct the characteristics of an audio. For example, the electronic device 201 may apply the first correction filter under the control of the processor 310, and thus correct the characteristics requiring correction (e.g., volume reduction, partial frequency level loss), compared to the characteristics of an audio in the third state.

In an embodiment, when the pipe passage state identified under the control of the processor 310 is in the second state, the electronic device 201 may apply the second correction filter to correct the characteristics of an audio. For example, the electronic device 201 may apply the second correction filter under the control of the processor 310, and thus correct the characteristics requiring correction (e.g., frequency level loss for each band), compared to the characteristics of an audio in the third state.

In an embodiment, when the pipe passage state identified under the control of the processor 310 is in the third state, the electronic device 201 may apply the third correction filter to correct the characteristics of an audio. For example, the electronic device 201 may apply the third correction filter separately to the case where the audio volume is low and the case where the audio volume is high under the control of the processor 310, and thus correct the characteristics of an audio of the case where the audio volume is excessively high.

According to an embodiment, in operation 1240, the electronic device 201 may output an audio signal to the outside.

In an embodiment, the electronic device 201 may apply the first to third correction filters under the control of the processor 310. In an embodiment, the electronic device 201 may apply the correction filters (e.g., the first correction filter, the second correction filter, and the third correction filter) under the control of the processor 310, and may thus output (or radiate) the audio signal of which the audio characteristics are corrected to the outside of the electronic device 201.

In various embodiments, the above description on the first to third states may be applied in a case where the movement distance of a display (e.g., the display 320) is in the first to third ranges.

Figure 15A:
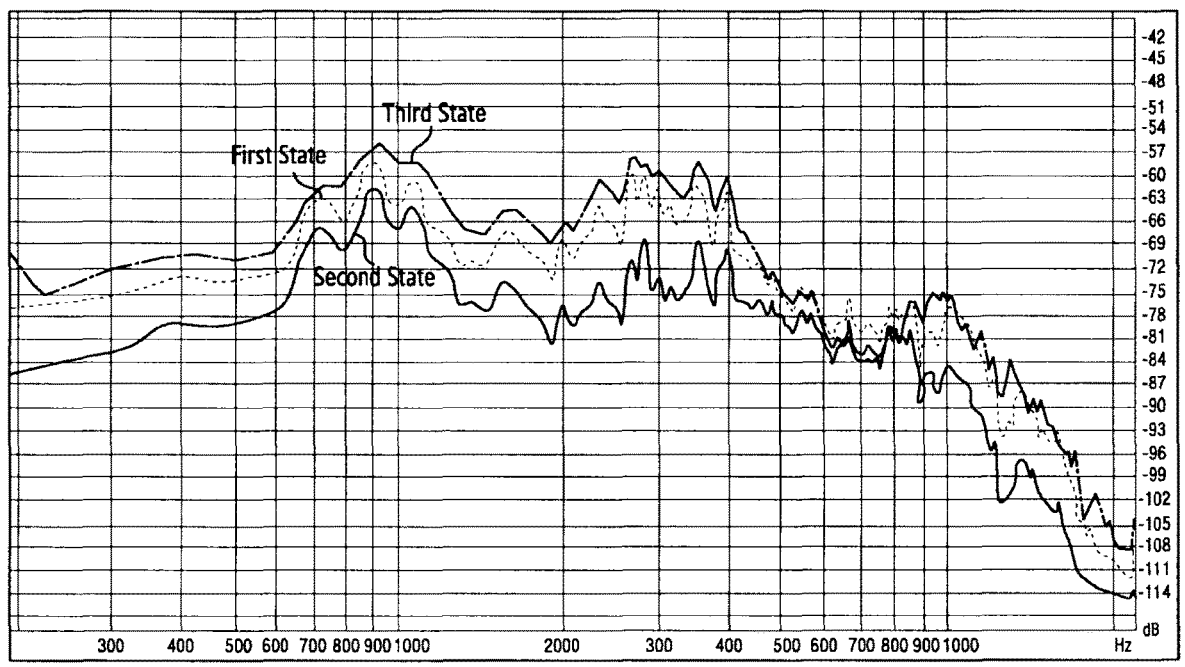
FIGS. 15A and 15B are graphs showing characteristics of an audio signal corrected by using a correction filter corresponding to a pipe passage state, according to various embodiments of the disclosure.
Figure 15B:
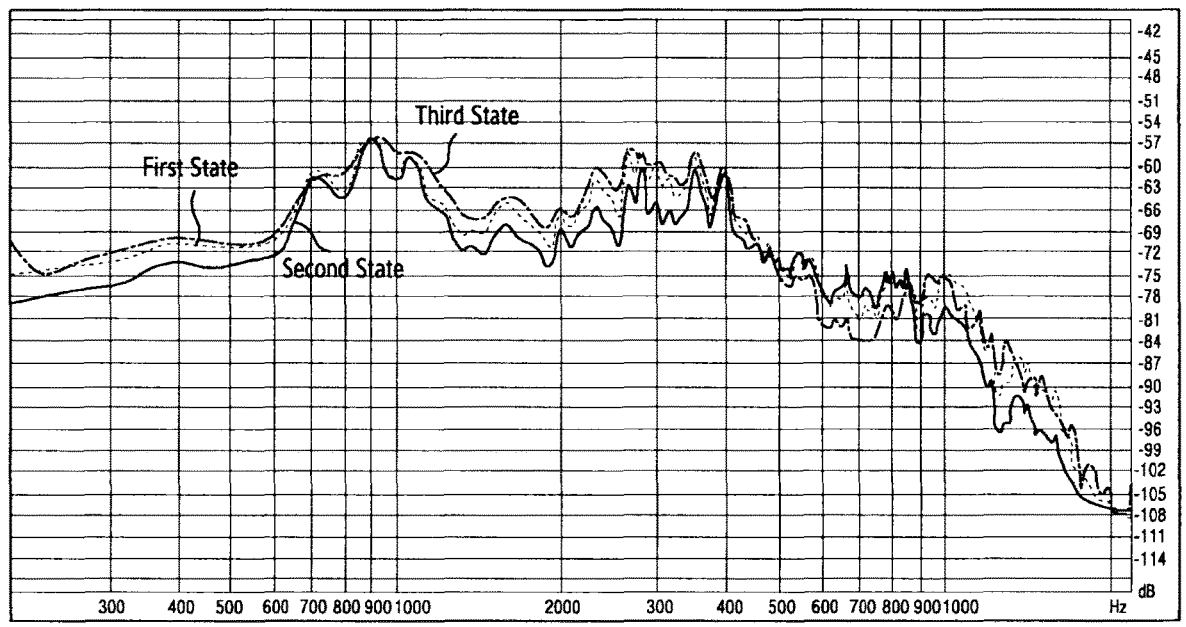

FIGS. 15A and 15B show the characteristics of an audio signal corrected by using correction filters corresponding to pipe passage states, according to various embodiments of the disclosure.

In various embodiments, the descriptions on the pipe passage states (e.g., the first to third states) according to FIGS. 15A and 15B may be applied to cases where the movement distances of a display (e.g., the display 320) are in the first to third ranges, respectively.

In an embodiment, FIG. 15A shows the differences of the audio characteristics in the first to third states before the correction filters (e.g., the first to third correction filters) are applied. Referring to FIG. 15A, compared to the audio characteristics in the third state which is a reference for correction, the audio characteristics corresponding to the first to second states have differences due to volume reduction, frequency loss, and frequency level loss for each band.

In an embodiment, FIG. 15B shows the differences of the audio characteristics in the first to third states after the correction filters (e.g., the first to third correction filters) are applied. Referring to FIG. 15B, compared to the audio characteristics in the third state which is a reference for correction, it may be identified that the difference between the audio characteristics corresponding to the first and second states to which the correction filter is applied is significantly reduced.

In an embodiment, referring to FIGS. 15A and 15B, the electronic device 201 may apply correction filters corresponding to pipe passage states under the control of the processor 310, and thus obtain the audio characteristics in the first to third states, which are the same as or similar to each other.

Figure 16:
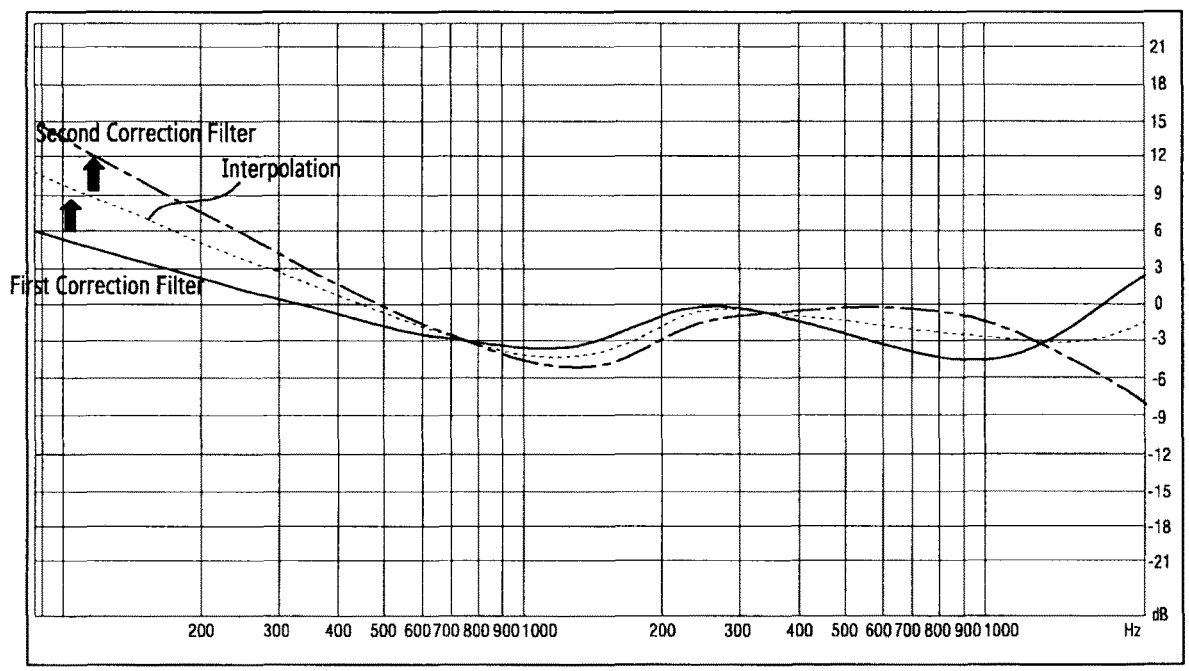
FIG. 16 is a graph showing an operation of interpolating characteristics of an audio signal corresponding to a pipe passage state by using a plurality of filters, according to an embodiment of the disclosure.

FIG. 16 shows an operation of interpolating the characteristics of an audio signal corresponding to pipe passage states by using a plurality of filters, according to an embodiment of the disclosure.

In various embodiments, the descriptions on the pipe passage states (e.g., the first to third states) according to FIG. 16 may be applied to cases where the movement distances of a display (e.g., the display 320) are in the first to third ranges, respectively.

In an embodiment, the electronic device 201 may interpolate and apply the first to third correction filters in each expansion step of the display 320, and may thus reduce the rapid change of the audio characteristics (e.g., sound quality) output from the speaker 340 to the outside of the electronic device 201.

In an embodiment, by expanding the display 320 by a predetermined distance from the state before the display 320 of the electronic device 201 is expanded, the pipe passage state may change from the first state to the second state. In addition, by expanding the display 320 by a predetermined distance or more from the state where the display 320 of the electronic device 201 expands by a predetermined distance, the pipe passage state may change from the second state to the third state.

In an embodiment, the electronic device 201 in the first state may apply the first correction filter under the control of the processor 310, and the electronic device 201 in the second state may apply the second correction filter under the control of the processor 310. In an embodiment, when the pipe passage state of the electronic device 201 is changed from the first state to the second state according to the expansion of the display 320, by applying a fourth correction filter interpolated to a median value between the audio characteristics of the first correction filter and the audio characteristics of the second correction filter during the time delay while having a predetermined time delay before and after the change, rapid changes in audio characteristics may be reduced.

In an embodiment, the electronic device 201 in the second state may apply the second correction filter under the control of the processor 310, and the electronic device 201 in the third state may apply the third correction filter under the control of the processor 310. In an embodiment, when the pipe passage state of the electronic device 201 is changed from the second state to the third state according to the expansion of the display 320, by applying a fifth correction filter interpolated to a median value between the audio characteristics of the second correction filter and the audio characteristics of the third correction filter during the time delay while having a predetermined time delay before and after the change, rapid changes in audio characteristics may be reduced.

Figure 17:
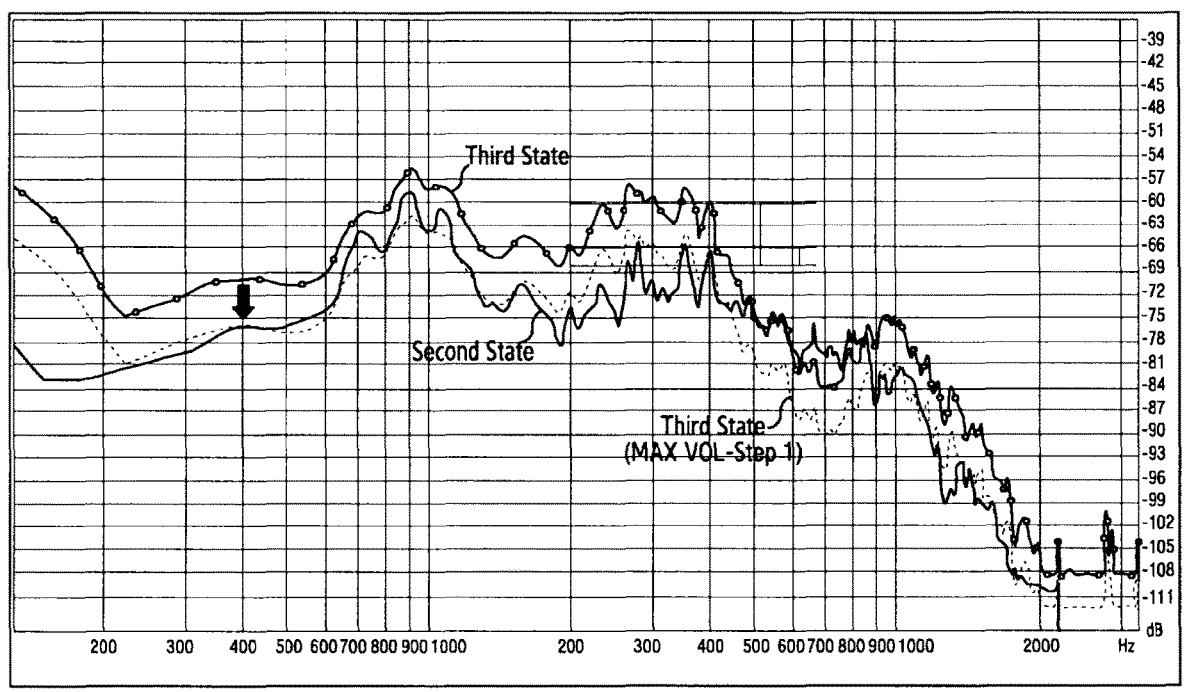
FIG. 17 is a graph showing an embodiment in which characteristics of an audio signal corresponding to a pipe passage state are corrected according to an embodiment of the disclosure.

FIG. 17 shows an embodiment in which the characteristics of an audio signal corresponding to a pipe passage state are corrected according to an embodiment of the disclosure.

In various embodiments, the descriptions on the pipe passage states (e.g., the first to third states) according to FIG. 17 may be applied to cases where the movement distances of a display (e.g., the display 320) are in the first to third ranges, respectively.

In an embodiment, at a stage where the volume produced from the speaker 340 is highest, the structural difference between the third state and the second state of the electronic device 201 may be large, and thus the effect of compensating the audio characteristics of the correction filters may appear relatively low.

In an embodiment, at a stage of which the volume is lower than that of the stage where the volume produced from the speaker 340 is highest, when the state of the pipe passage through which an audio of the speaker 340 is output is changed, the audio output of the third state which is a reference may decrease, the differences of the audio characteristics between the first state and the second state and the third state, and thus the effect of applying the correction filters may further increase. For example, the output characteristics of the final audio signal for each state of the pipe passage through which the audio signal of the electronic device 201 is output may be similar to each other. As a specific example, when the highest level of the volume level is level 15, if the pipe passage state is changed from the third state to the second state during playback of the speaker 340 in the volume level 14, in the second state, the virtual volume level may be maintained at 15 levels and the correction filters may be applied.

FIGS. 18A to 18C show the shapes in which a display of an electronic device including a speaker moves (expands), according to various embodiments of the disclosure.

In various embodiments, the descriptions on the pipe passage states (e.g., the first to third states) according to FIGS. 18A, 18B, and 18C may be applied to cases where the movement distances of a display (e.g., the display 320) are in the first to third ranges, respectively.

In an embodiment, an electronic device 201 may include a first housing 410, a second housing 420, and a speaker 340.

In an embodiment, the second housing 420 may be coupled to the first housing 410 to be movable with respect to the fixed first housing 410. For example, the second housing 420 may move along the movement or expansion of a display (e.g., the display 320), and the distance of the second housing 420 with respect to the first housing 410 may vary.

In an embodiment, the first housing 410 may include the speaker 340. For example, the speaker 340 may be disposed inside the first housing 410, and the speaker 340 may be disposed at a lower portion of the first housing where a pipe passage (e.g., a pipe passage 411) is formed for smooth output of a produced audio signal or sound.

In an embodiment, referring to FIGS. 18A to 18C, a pipe passage 411 may be formed at a position in the first housing 410 corresponding to the speaker 340. For example, the pipe passage 411 may be formed in the first housing in a shape of multiple holes or a single hole. In addition, for smooth output of an audio signal or sound produced from the speaker 340, the pipe passage 411 may be formed at a position corresponding to the speaker 340. As another example, the pipe passage 411 may be formed to extend through at least a part of the first housing 410.

In an embodiment, referring to FIGS. 18A, in a state (e.g., a first state) where a display (e.g., the display 320) does not move or expand, a pipe passage 421 may be formed at a position corresponding to the pipe passage 411. For example, the pipe passage 421 may be formed in the second housing 420, and be formed to extend through at least a part of the second housing 420. As another example, an audio signal or sound produced from the speaker 340 may pass through the pipe passage 411 and be output to the outside of the first housing 410, and be output to the outside of the second housing 420 through the pipe passage 421.

In an embodiment, referring to FIG. 18B, in a state (e.g., a second state) where a display (e.g., the display 320) moves or expands by a predetermined distance, the pipe passage 411 and the pipe passage 421 may be positioned to partially correspond to each other. For example, a cross-section of the pipe passage 411 and a cross-section of the pipe passage 421 may at least partially overlap each other. Alternatively, the pipe passage 411 and the pipe passage 421 may be described as sharing a partial area with each other. As another example, an audio signal or sound produced from the speaker 340 may pass through the pipe passage 411 and be output to the outside of the second housing 420 through at least a part of the pipe passage 421.

In an embodiment, referring to FIG. 18C, in a state (e.g., a third state) where a display (e.g., the display 320) moves or expands by a predetermined distance or more, the position of the pipe passage 411 and the position of the pipe passage 421 may not correspond to each other. For example, a cross-section of the pipe passage 411 and a cross-section of the pipe passage 421 may not overlap each other. As another example, an audio signal or sound produced from the speaker 340 may be output to the outside of the second housing 420 through only the first pipe passage 411.

In an embodiment, when the movement distance of a display (e.g., the display 320) with respect to the first housing 410 is in a predetermined range (e.g., a first range), a pipe passage state may be a first state. For example, a first range may be a range where the first pipe passage 411 and the second pipe passage 421 overlap each other. As another example, the first range may indicate a range where a display (e.g., the display 320) does not move.

In an embodiment, when the movement distance of a display (e.g., the display 320) with respect to the first housing 410 is in a predetermined range (e.g., a second range), a pipe passage state may be a second state. For example, a second range may be a range where the display 320 have moved to the distance where a part of the second pipe passage 421 and the first pipe passage 411 overlap each other.

In an embodiment, when the movement distance of a display (e.g., the display 320) with respect to the first housing 410 is in a predetermined range (e.g., a third range), a pipe passage state may be a third state. For example, a third range may be a range where the display 320 moves to the distance where the first pipe passage 411 and the second pipe passage 421 do not overlap each other.

In an embodiment, the third range may be a range in which the display 320 moves a greater distance with respect to the first housing 410 than the first and second ranges.

In an embodiment, the second range may be a range in which the display 320 moves a greater distance with respect to the first housing 410 than the first range.

Figures 19A, 19B:
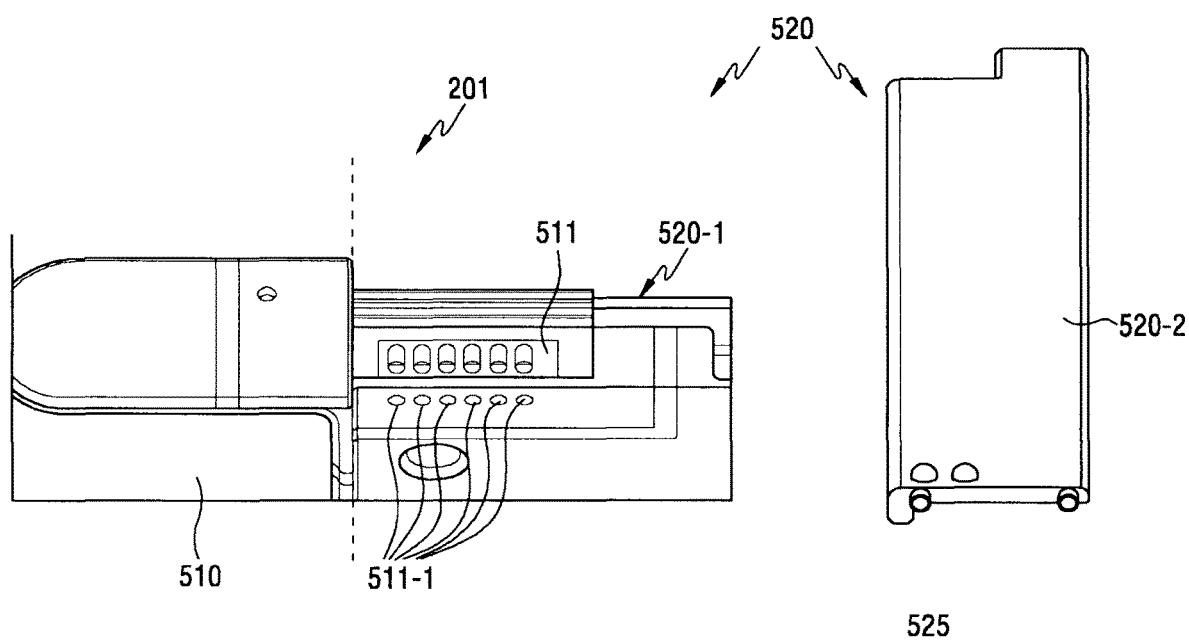
FIGS. 19A and 19B are views showing an auxiliary structure for assisting display movement (or expansion) and display fixation of an electronic device including a speaker, according to various embodiments of the disclosure.

FIGS. 19A and 19B show an auxiliary structure for assisting display movement (or expansion) and display fixation of an electronic device including a speaker, according to various embodiments of the disclosure.

In an embodiment, an electronic device 201 may include a first housing 510 and a second housing 520. In an embodiment, the second housing 520 may be coupled to the first housing 510 to be movable with respect to the first housing 510.

In an embodiment, a pipe passage 511 for outputting an audio signal or sound produced from a speaker (e.g., a speaker 540) may be formed in the first housing 510. The pipe passage 511 may be formed in a shape of multiple holes.

In an embodiment, referring to FIGS. 19A and 19B, the second housing 520 may be illustrated by dividing the same into an inner housing 520-1 and an outer housing 520-2 for the convenience of explanation.

In an embodiment, fixing holes 511-1 for fixing a display (e.g., the display 320) may be formed through the inner housing 520-1 of the second housing 520. For example, the fixing holes 511-1 may be formed at a position corresponding to the pipe passage 511 formed in the second housing 520. As another example, the fixing holes 511-1 may be formed in a shape of multiple holes.

In an embodiment, fixing protrusions 525 to be fixed to the fixing holes 511-1 formed in the inner housing 520-1 may be arranged on the outer housing 520-2 of the second housing 520.

In an embodiment, the fixing protrusions 525 may be fixed to the fixing holes 511-1 to assist in fixing a display (e.g., the display 320) or fixing the second housing 520.

In an embodiment, the display (e.g., the display 320) or the second housing 520 may be fixed when the fixing holes 511-1 and the fixing protrusions 525 coincide.

FIGS. 20A to 20C show the movement (or expansion) of a display of an electronic device including a speaker from various aspects, according to various embodiments of the disclosure. An operation of the electronic device 201 in which the fixing holes 511-1 and the fixing protrusions 525 described with reference to FIGS. 19A and 19B are formed will be described in detail with reference to FIGS. 20A to 20C.

In an embodiment, referring to FIG. 20A, the second housing 520 is fixed when the fixing holes 511-1 and the fixing protrusions 525 coincide. In an embodiment, the fixing protrusions 525 may be seated at a position corresponding to the fixing holes 511-1 to allow the second housing 520 to be fixed. In an embodiment, when the second housing 520 is fixed, the holes of the pipe passage 511 and the holes of a pipe passage 521 of the second housing 520 may coincide.

In an embodiment, referring to FIG. 20B, the second housing 520 in a fixed state is shown from a side surface thereof. In an embodiment, the second housing 520 may be fixed by fixing the fixing protrusions 525 to the fixing holes 511-1. In an embodiment, the holes of the pipe passage 511 and the holes of the pipe passage 521 may coincide, and thus an audio signal or sound produced from the speaker 340 may pass through the pipe passage 511 and the pipe passage 521 to be output to the outside of the second housing 520.

In an embodiment, referring to FIG. 20C, the fixing protrusions 525 moves left and right and is fixed to the fixing holes 511-1. For example, there may be a plurality of fixing protrusions 525. In addition, the fixing protrusions 525 may be seated into at least a part of the plurality of fixing holes 511-1 to be fixed thereto. As another example, the fixing protrusions 525 may move to holes formed in the moving direction of the second housing 520 among the fixing holes 511-1. The fixing protrusions 525 may be seated in the fixing holes (511-1) formed in the moving direction of the second housing 520, and accordingly the second housing 520 may be fixed.

FIGS. 21A to 21H specifically show the characteristics of an audio signal according to the movement (or expansion) of a display of an electronic device including a speaker, according to various embodiments of the disclosure.

In an embodiment, FIGS. 21A to 21F show the characteristics of an audio signal as the second housing 520 moves along with a movement or expansion of a display (e.g., the display 320) of the electronic device 201. In an embodiment, the characteristics of the audio signal may be characteristics of the audio signal output by the speaker 340, and include at least frequency characteristics and/or volume characteristics.

In an embodiment, FIG. 21A shows a state where the display (e.g., the display 320) or the second housing 520 does not move. In an embodiment, the movement distance of the display (e.g., the display 320) or the second housing 520 in each drawing may increase, moving from FIGS. 21B to 21H.

In an embodiment, as the movement distance of the display (e.g., the display 320) or the second housing 520 is greater, the area in which the pipe passage 511 and the pipe passage 521 overlap each other may be smaller, and the rate at which an audio signal produced from the speaker (e.g., the speaker 340) is output to the outside through only the pipe passage 511 may also increase.

In an embodiment, when there is an area where the pipe passage 511 and the pipe passage 521 partially overlap each other as shown in FIG. 21B, the volume of an audio signal produced from the speaker (e.g., the speaker 340) may decrease.

In an embodiment, moving from FIGS. 21B to 21F, the area where the pipe passage 511 and the pipe passage 521 overlap each other decreases, and the rate at which an audio signal from the speaker (e.g., the speaker 340) is output through only the pipe passage 511 may increase. In an embodiment, moving from FIGS. 21B to 21F, the volume of an audio signal may gradually increase, and the frequency loss of low and high bands may be increasingly improved.

In an embodiment, in a case where only a small part of the pipe passage 511 overlaps the pipe passage as shown in FIG. 21G, the frequency loss of low and high bands may be further improved, compared to cases in FIGS. 21B to 21F.

In an embodiment, in a case where the moving distance of the display (e.g., the display 320) or the second housing 520 is a predetermined distance or more as shown in FIG. 21H, an audio signal produced from the speaker (e.g., the speaker 340) may be output to the outside through only the pipe passage 511. In an embodiment, in the case of FIG. 21H, audio characteristics including at least volume, sound quality, and/or frequency characteristics may be improved.

Figure 22:
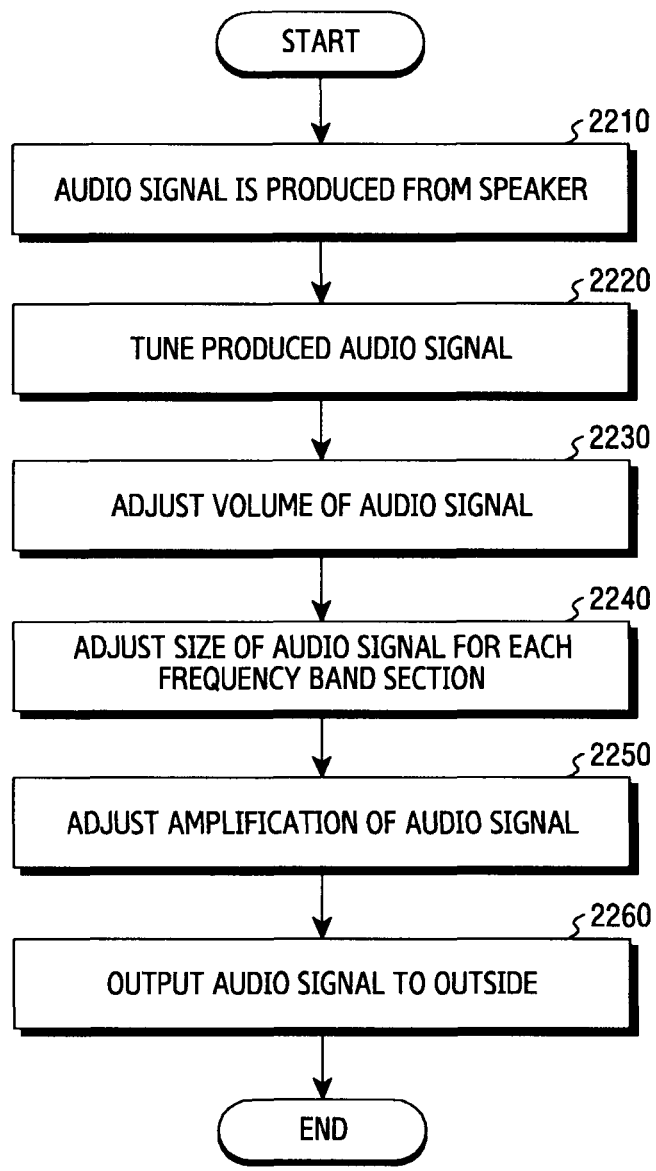
FIG. 22 is a flowchart specifically showing a flow in which an electronic device including a speaker corrects characteristics of an audio signal corresponding to a pipe passage state by using a filter, according to an embodiment of the disclosure.

FIG. 22 specifically shows a flow in which an electronic device including a speaker corrects the characteristics of an audio signal corresponding to a pipe passage state by using a filter, according to an embodiment of the disclosure.

According to an embodiment, in operation 2210, an audio signal may be produced from a speaker of an electronic device 201.

According to an embodiment, in operation 2220, the electronic device 201 may tune the produced audio signal.

In an embodiment, there is an area (C) covered by the second housing 520, and thus the total effective area (H) of the pipe passages may be determined by sum of the effective area (A) of the pipe passage 511 and the effective area (B) where the pipe passage 511 and the pipe passage 521 overlap each other. An effective area may indicate an actual area in which an audio signal or volume produced from the speaker 340 is capable of being output to the outside.

In an embodiment, the volume of the audio output may be greatest when the effective area (A) of the pipe passage 511 is maximum, and may decrease as the effective area (B) where the pipe passage 511 and the pipe passage 521 overlap each other and the area (C) covered by the second housing 520 increase.

In an embodiment, when applying a correction filter (e.g., the first correction filter, the second correction filter, and the third correction filter) for each of the movement distance (e.g., the first range, the second range, and the third range) and/or the pipe passage state (e.g., the first state, the second state, and the third state) under the control of the processor 310, the electronic device 201 may apply the correction filter based on the above-mentioned area ratios. For example, under the control of the processor 310, the electronic device 201 may perform volume compensation for the area (C) covered by the second housing 520, volume compensation considering the audio characteristics of the effective area (A) of the pipe passage 511 and the ratio of the effective area (A) of the pipe passage 511 to the total effective area (H) of the pipe passages, and volume compensation of the audio characteristics in the effective area (B) where the pipe passages 511 and the pipe passage 521 overlap each other considering the ratio of the effective area (B) to the total effective area (H).

According to an embodiment, in operation 2230, the electronic device 201 may correct the volume of an audio signal.

In an embodiment, in a state where the correction filters are not applied, the electronic device 201 may measure and store the volume for each of the moving distances (e.g., the first range, the second range, and the third range) and/or the states (e.g., the first state, the second state, and the third state). For example, under the control of the processor 310, the electronic device 201 may measure the volume before correction in the first state, the second state, and/or the third state (or the first range, the second range, and/or the third range), and store the volume in the memory 350.

In an embodiment, under the control of the processor 310, the electronic device 201 may correct audio output in the first state (or first range) and the second state (or second range) to make the volume to be the same as that in the third state (or third range) which is a reference for correction of audio output.

In an embodiment, under the control of the processor 310, the electronic device 201 may adjust an audio amplifier (AMP) output (e.g., VI AMP), and thus perform additional volume correction.

According to an embodiment, in operation 2240, the electronic device 201 may adjust the amplitude of an audio signal for each frequency band section.

Figure 23:
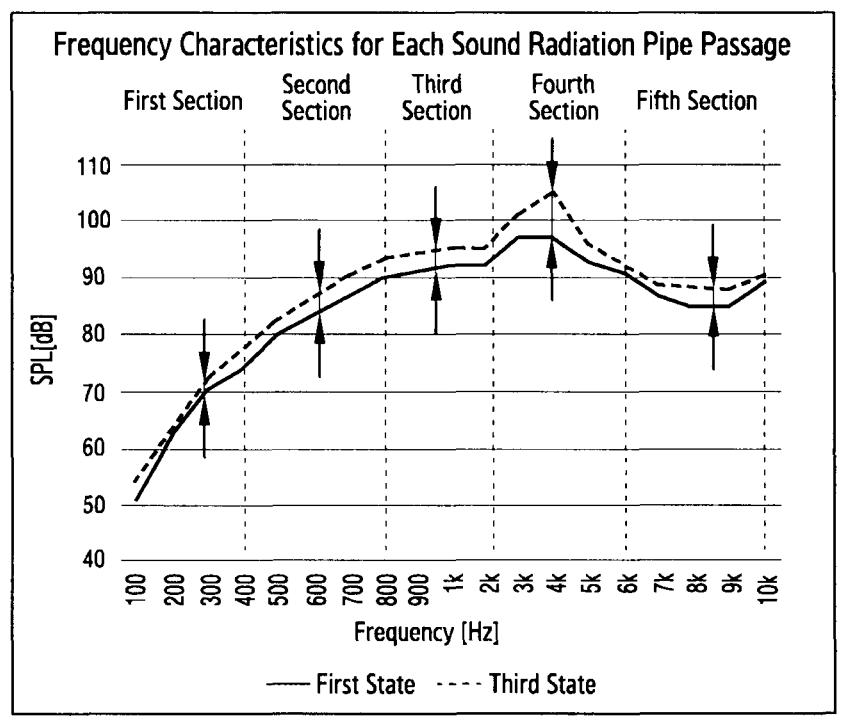
FIG. 23 is a graph specifically showing a flow in which an electronic device including a speaker corrects characteristics of an audio signal corresponding to a pipe passage state for each section by using a filter, according to an embodiment of the disclosure.

According to an embodiment, operation 2240 will be described with reference to FIG. 23 which specifically illustrates an embodiment of a flow in which an electronic device including a speaker corrects characteristics of an audio signal corresponding to a pipe passage state (or moving distance) for each section using a filter.

In an embodiment, under the control of the processor 310, the electronic device 201 may measure audio output of which the volume correction corresponding to the movement distance (e.g., the first range, the second range, and the third range) and/or the pipe passage state (e.g., the first state, the second state, and the third state) has been performed.

In an embodiment, under the control of the processor 310, the electronic device 201 may perform correction by dividing the measured audio output into frequency band sections. For example, referring to FIG. 23, under the control of the processor 310, the electronic device 201 may divide the audio output into first to fifth sections. Under the control of the processor 310, the electronic device 201 may configure the center frequency based on a place where the difference is large based on the audio output in the third state (or third range), and adjust a limiter, an attack time, a release time, a gain, and the like for each of the first to fifth sections.

In an embodiment, the division of the above-described audio output is not limited to the first to fifth sections, and there may be no limitation in dividing the sections.

According to an embodiment, in operation 2250, the electronic device 201 may adjust the amplification of an audio signal.

In an embodiment, even after performing operations 2210 to 2240 under the control of the processor 310, when there is a difference compared to the audio output in the third state (or third range), the electronic device 201 may perform correction by applying an AM filter. In an embodiment, by adjusting the center frequency, bandwidth of a band, and gain under the control of the processor 310, the electronic device 201 may adjust an audio output to maintain the same or similar output as the audio output corresponding to the reference state (e.g., the third state or the third range).

According to an embodiment, in operation 2260, the electronic device 201 may output an audio signal to the outside. For example, the electronic device 201 may perform correction of audio output according to operations 2210 to 2250, and then output an audio signal to the outside of the electronic device 201.

Figure 24:
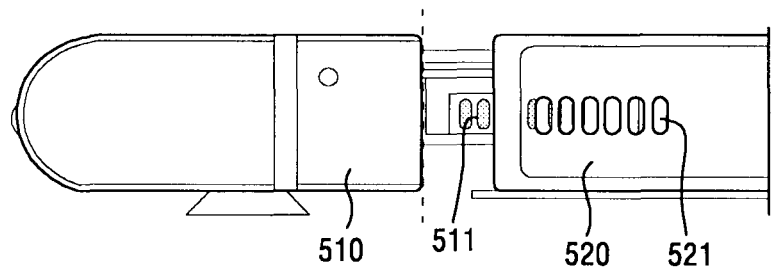
FIG. 24 is a view showing a structure of an electronic device which corrects characteristics of an audio signal corresponding to a pipe passage state based on a median value, according to an embodiment of the disclosure.

FIG. 24 shows a structure of an electronic device which corrects the characteristics of an audio signal corresponding to a pipe passage state (or movement distance) based on a median value, in an embodiment.

In an embodiment, referring to FIG. 24, the second housing 520 of the electronic device 201 may be fixed to, instead of a pre-defined position according to fixing protrusions (e.g., the fixing protrusions 525) and fixing holes (e.g., the fixing holes 511-1), a position misaligned from the pre-defined position misaligned from the predefined position to maintain a specific aspect ratio.

In an embodiment, the fixing protrusions (e.g., the fixing protrusions 525) and the fixing holes (e.g., the fixing holes 511-1) may be fixed at a position where the fixing protrusions and fixing holes are aligned. In an embodiment, under the control of the processor 310, the electronic device 201 may apply a correction filter with a median value of applied values of the correction filter defined before and after the aligned holes.

In an embodiment, when a hole of the pipe passage 511 and a hole of the pipe passage 521 are aligned in an n-$^{th}$ fixing hole, the electronic device 201 may interpolate the median value of the value of the correction filter at the time of coinciding at the n-$^{th}$ fixing hole and the value of the correction filter at the time of coinciding at the (n+1)$^{th}$ fixing hole, and apply the interpolated value.

FIG. 25 shows an operation of an electronic device for a user interface when a display of the electronic device rapidly moves, according to an embodiment of the disclosure.

In an embodiment, without going through an intermediate step, a user may change the state of the electronic device 201 from an unexpanded state (or slide-in state) of the display (e.g., the display 320) to a fully expanded state (or slide-out state) of the display (e.g., the display 320). In another embodiment, without going through an intermediate step, a user may change the state of the electronic device 201 from a fully expanded state of the display (e.g., the display 320) to an unexpanded state of the display (e.g., the display 320).

In an embodiment, under the control of the processor 310, the electronic device 201 may apply a fade-in or fade-out effect to audio output, and thus provide a user experience consistent with the physical change of the electronic device 201 to a user.

In an embodiment, when changing from a slide-out state to a slide-in state at the same volume level, if the overlapping area of the pipe passage 511 and the pipe passage 521 increases and the overall volume decreases by 3 dB, the electronic device 201, under the control of the processor 310, may increase audio output by 3 dB, and sequentially apply volume compensation for each frequency band section and amplification adjustment of the audio output.

In an embodiment, under the control of the processor 310, the electronic device 201 may detect a movement distance of a display (e.g., the display 320), divide the moving distance according to the distance of each step of the audio signal in the total extended distance (D), and thus apply a correction filter. For example, in a case of changing audio output by 0.5 dB, the electronic device 201, under the control of the processor 310, may change the audio output in units of 0.5 dB for every D/6 distance to allow a user to perceive the change as a continuous sound change.

In an embodiment, the steps of changing the audio output according to the distance by the electronic device 201 are not limited to the above six steps and may be further simplified or subdivided.

FIGS. 26A to 26D are a view showing a user interface which may select whether to correct an audio output, according to various embodiments of the disclosure.

In an embodiment, an electronic device (e.g., the electronic device 201) may selectively perform a function of correcting audio output according to a user configuration.

Figure 26A:
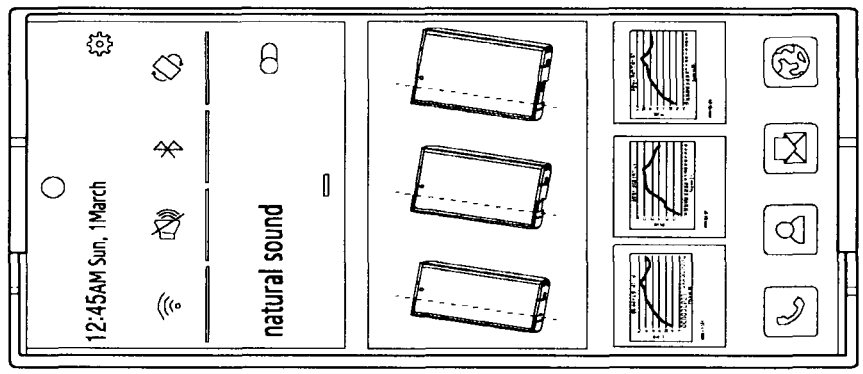
FIGS. 26A, 26B, 26C, and 26D are views showing a user interface which may select whether to correct an audio output, according to various embodiments of the disclosure.

In an embodiment, referring to FIG. 26A, when a user wants to perform correction for natural audio output according to the expansion or movement of a display (e.g., the display 320) of an electronic device (e.g., the electronic device 201), the user may configure the configuration to correct the audio output to on or to an "in use" state. In this case, for example, when the display 320 of the electronic device 201 expands or moves, the electronic device, under the control of the processor 310, may perform correction of audio output according to the movement distance (e.g., the first range, the second range, and the third range) and/or the pipe passage state (e.g., the first state, the second state, and the third state).

In an embodiment, if the configuration for correcting the audio output of the electronic device 201 is configured to an "in use" state, the electronic device 201, under the control of the processor 310, may provide a user with the output to which audio output correction is applied regardless of the corresponding pipe passage state.

In an embodiment, for the configuration for correcting audio output, a user may configure the electronic device 201 to perform correction of audio output only when a display (e.g., the display 320) slides out. In this case, under the control of the processor 310, the electronic device 201 may perform correction of audio output only when the display 320 slides out.

In an embodiment, for the configuration for correcting audio output, a user may configure the electronic device 201 to perform correction of audio output only when a display (e.g., the display 320) slides in. In this case, under the control of the processor 310, the electronic device 201 may perform correction of audio output only when the display 320 slides in.

Figure 26B:
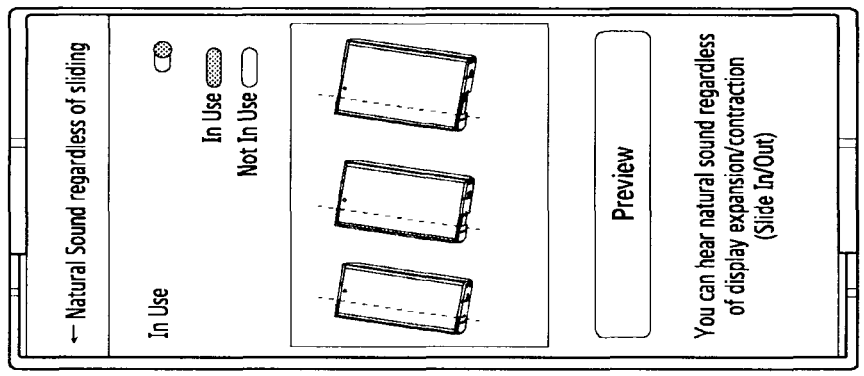

In an embodiment, referring to FIG. 26B, when a user does not want to perform correction of audio output according to the expansion or movement of a display (e.g., the display 320) of an electronic device (e.g., the electronic device 201), the user may configure the configuration to correct the audio output to off or to a "not in use" state. In this case, for example, even if the display 320 of the electronic device 201 expands or moves, the electronic device may not perform correction of audio output according to the movement distance (e.g., the first range, the second range, and the third range) and/or the pipe passage state (e.g., the first state, the second state, and the third state).

Figure 26C:
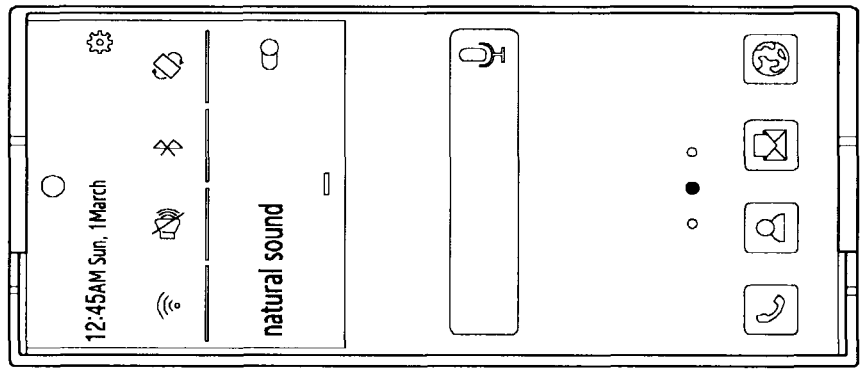

In an embodiment, referring to FIG. 26C, under the control of the processor 310, the electronic device 201 may provide corrected audio output to a user as a preview. For example, when a user configures the configuration to a "not in use", the electronic device 201 may not perform correction of audio output under the control of the processor 310, may provide the user with a preview based on different audio outputs according to each pipe passage state. As another example, when a user configures the configuration to an "in use", the electronic device 201 may perform correction of audio output under the control of the processor 310, and provide a preview based on the audio output corrected based on each pipe passage state to a user.

Figure 26D:
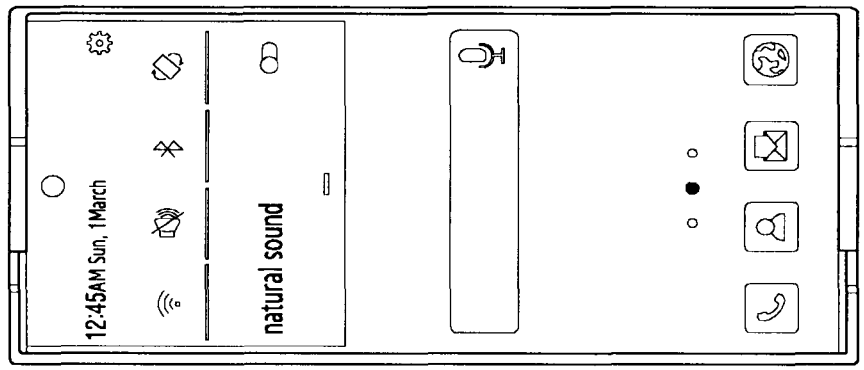

In an embodiment, referring to FIG. 26D, the electronic device 201, under the control of the processor 310, may display, on the display 320, a graph for the characteristics of audio output according to the movement distance (e.g., the first range, the second range, and the third range) and/or the pipe passage state (e.g., the first state, the second state, and the third state), and thus provide information on the characteristics of the audio output to a user. For example, at the preview state described in FIG. 26C above, if a user selects the movement distance (e.g., the first range, the second range, and the third range) and/or the pipe passage state (e.g., the first state, the second state, and the third state), the electronic device 201, under the control of the processor 310, may respond to the selection and display, on the display 320, a graph for the characteristics of audio output corresponding to the movement distance and/or the pipe passage state. As another example, even if there is no selected user input, the electronic device 201, under the control of the processor 310, may display, on the display 320, a graph for the characteristics of audio output corresponding to the movement distance and/or the pipe passage state.

In an electronic device (e.g., the electronic device 201) according to an embodiment, the electronic device (e.g., the electronic device 201) may include a first housing (e.g., the first housing 210) and a second housing (e.g., the second housing 220) coupled to the first housing (e.g., the first housing 210) to be movable with respect to the first housing (e.g., the first housing 210), a speaker (e.g., the speaker 340) disposed in the first housing (e.g., the first housing 210) to output an audio signal, a flexible display (e.g., the display 320) which has at least a portion disposed in the first housing (e.g., the first housing 210) and the second housing (e.g., the second housing 220) and of which the size of an area visually exposed via a front surface of the electronic device (e.g., the electronic device 201) is expandable according to a movement of the second housing (e.g. the second housing 220), a first pipe passage (e.g., the first pipe passage 211) formed in the first housing (e.g., the first housing 210) to allow the audio signal to be output to the outside of the first housing (e.g., the first housing 210), a second pipe passage (e.g., the second pipe passage 221), in a state where a movement distance of the second housing (e.g., the second housing 220) is in a first range, formed at a position corresponding to the first pipe passage (e.g., the first pipe passage 211) and formed in the second housing (e.g., the second housing 220) to allow the audio signal to pass through the first pipe passage (e.g., the first pipe passage 211) and be output to the outside of the electronic device (e.g., the electronic device 201), a third pipe passage (e.g., the third pipe passage 222), in a state where a movement distance of the second housing (e.g., the second housing 220) is in a second range, connected to the first pipe passage (e.g., the first pipe passage 211) and formed in the second housing (e.g., the second housing 220) to allow the audio signal to be output to the outside of the electronic device (e.g., the electronic device 201), and a processor (e.g., the processor 310) operatively connected to the speaker (e.g., the speaker 340) and the flexible display (e.g., the display 320), wherein the processor (e.g., the processor 310) detects the movement distance of the second housing (e.g., the second housing 220) with respect to the first housing (e.g., the first housing 210), and corrects the characteristics of the audio signal produced from the speaker (e.g., the speaker 340) based on the detected movement distance.

In the electronic device (e.g., the electronic device 201) according to an embodiment, the audio signal of the electronic device (e.g., the electronic device 201) may be output to the outside of the electronic device (e.g., the electronic device 201) in a state where a movement distance of the flexible display (e.g., the display 320) with respect to the first housing (e.g., the first housing 210) is in a third range.

In the electronic device (e.g., the electronic device 201) according to an embodiment, the processor (e.g., the processor 310) may apply a first correction filter in a case where the movement distance is in a first range, and apply a second correction filter in a case where the movement distance is in a second range.

In the electronic device (e.g., the electronic device 201) according to an embodiment, the processor (e.g., the processor 310) may apply a median value of the characteristics of the first correction filter and the characteristics of the second correction filter, while the movement distance changes from the first range to the second range.

In the electronic device (e.g., the electronic device 201) according to an embodiment, the processor (e.g., the processor 310) may apply a third correction filter in a case where the movement distance is in a third range.

In the electronic device (e.g., the electronic device 201) according to an embodiment, the processor (e.g., the processor 310) may differently apply the third correction filter according to the volume size of the audio signal produced from the speaker (e.g., the speaker 340).

In the electronic device (e.g., the electronic device 201) according to an embodiment, when correcting the characteristics of the audio signal, in a case of obtaining an input which turns on the configuration to correct audio output, the processor (e.g., the processor 310) may perform correction of the characteristics of the audio signal, and, in a case of obtaining an input which turns off the configuration to correct audio output, may not perform correction of the characteristics of the audio signal.

In the electronic device (e.g., the electronic device 201) according to an embodiment, the electronic device (e.g., the electronic device 201) may further include a display movement detection sensor (e.g., the display movement detection sensor 330), and the processor (e.g., the processor 310) may detect the movement distance of the second housing (e.g., the second housing 220) with respect to the first housing (e.g., the first housing 210) using the display movement detection sensor (e.g., the display movement detection sensor 330).

In the electronic device (e.g., the electronic device 201) according to an embodiment, the first pipe passage (e.g., the first pipe passage 211), the second pipe passage (e.g., the second pipe passage 221), and the third pipe passage (e.g., the third pipe passage 222) may have a shape of multiple holes.

In the electronic device (e.g., the electronic device 201) according to an embodiment, when correcting the characteristics of the audio signal, the processor (e.g., the processor 310) may tune the audio signal, adjust the volume of the audio signal, and adjust the amplification of the audio signal.

In the electronic device (e.g., the electronic device 201) according to an embodiment, the processor (e.g., the processor 310) may adjust the amplitude of the audio signal for each frequency band section.

In the electronic device (e.g., the electronic device 201) according to an embodiment, the second housing (e.g., the second housing 220) may include an inner housing and an outer housing, fixing protrusions for fixing the display (e.g., the display 320) may be arranged on the outer housing, and fixing holes for seating the fixing protrusions thereinto may be formed through the inner housing.

In the electronic device (e.g., the electronic device 201) according to an embodiment, the electronic device (e.g., the electronic device 201) may further include a memory (e.g., the memory 350) for storing the characteristics of the audio signal corresponding to the movement distance, and the processor (e.g., the processor 310) may correct the characteristics of the audio signal produced from the speaker (e.g., the speaker 340) based on the characteristics of the audio signal stored in the memory (e.g., the memory 350).

In the electronic device (e.g., the electronic device 201) according to an embodiment, the processor (e.g., the processor 310) may identify a correction filter based on the characteristics of the audio signal stored in the memory (e.g., the memory 350).

In the electronic device (e.g., the electronic device 201) according to an embodiment, the processor (e.g., the processor 310) may apply a first correction filter in a case where the movement distance is in a first range, and apply a second correction filter in a case where the movement distance is in a second range, and the first correction filter and the second correction filter may be configured based on a case where the movement distance is in a third range.

In an electronic device (e.g., the electronic device 201) according to an embodiment, the electronic device (e.g., the electronic device 201) may include a first housing (e.g., the first housing 210) and a second housing (e.g., the second housing 220) coupled to the first housing (e.g., the first housing 210) to be movable with respect to the first housing (e.g., the first housing 210), a speaker (the speaker 340) included in the first housing (e.g., the first housing 210) and outputting an audio signal, a flexible display (e.g., the display 320) disposed in the first housing (e.g., the first housing 210) and the second housing (e.g., the second housing 220) and movable along the second housing (e.g., the second housing 220), a first pipe passage (e.g., the first pipe passage 211) formed in the first housing (e.g., the first housing 210) to allow the audio signal to be output to the outside of the second housing (e.g., the second housing 220), a second pipe passage (e.g., the second pipe passage 221), in a state where the movement distance of the flexible display (e.g., the display 320) with respect to the first housing (e.g., the first housing 210) is in a first range, formed at a position corresponding to the first pipe passage (e.g., the first pipe passage 211) and formed in the second housing (e.g., the second housing 220) to allow the audio signal to be output to the outside of the electronic device (e.g., the electronic device 201), and a processor (e.g., the processor 310) operatively connected to the speaker (e.g., the speaker 340) and the flexible display (e.g., the display 320), wherein the processor (e.g., the processor 310) detects the movement distance of the flexible display (e.g., the display 320) with respect to the first housing (e.g., the first housing 210), and corrects the characteristics of the audio signal produced from the speaker (e.g., the speaker 340) based on the pipe passage state according to the detected movement distance.

In the electronic device (e.g., the electronic device 201) according to an embodiment, in a state where the movement distance of the flexible display (e.g., the display 320) with respect to the first housing (e.g., the first housing 210) is in a second range, the audio signal may be output to the outside of the electronic device (e.g., the electronic device 201) through the first pipe passage (e.g., the first pipe passage 211).

In the electronic device (e.g., the electronic device 201) according to an embodiment, the processor (e.g., the processor 310) may apply a first correction filter in a case where the pipe passage state is a first state, and apply a second correction filter in a case where the pipe passage state is a second state.

In the electronic device (e.g., the electronic device 201) according to an embodiment, the processor (e.g., the processor 310) may provide, to a user, the corrected audio signal corresponding to the pipe passage state as a preview.

In the electronic device (e.g., the electronic device 201) according to an embodiment, the processor (e.g., the processor 310) may apply a third correction filter in a case where the pipe passage state is a third state.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first housing and a second housing coupled to the first housing to be movable with respect to the first housing;
a speaker disposed in the first housing to output an audio signal; and
a flexible display disposed in the first housing and the second housing and of which a size of an area visually exposed via a front surface of the electronic device is changeable according to a movement distance of the second housing with respect to the first housing;
at least one processor; and
memory storing at least one computer program including computer-executable instructions, and
wherein a first passage is formed in the first housing to allow the audio signal to be output to outside of the first housing,
wherein a second passage and a third passage are formed in the second housing,
wherein in a state where the movement distance of the second housing is in a first range, the second passage is positioned at a position corresponding to the first passage to allow the audio signal passed through the first passage to be output to the outside of the electronic device,
wherein in a state where the movement distance of the second housing is in a second range, the third passage is positioned at a position corresponding to the first passage to allow the audio signal passed through the first passage to be output to the outside of the electronic device, and
wherein the instructions, when executed by the at least one processor individually or collectively, cause the electronic device to:
detect the movement distance of the second housing with respect to the first housing, and
change characteristics of the audio signal to be produced from the speaker based on the movement distance of the second housing.

2. The electronic device of claim 1, wherein, in a state where the movement distance of the second first housing is in a third range, the audio signal is output to the outside of the electronic device.

3. The electronic device of claim 1, wherein the instructions, when executed by the at least one processor individually or collectively, further cause the electronic device to:
apply a first correction filter in case that the movement distance is in the first range, and
apply a second correction filter in case that the movement distance is in the second range.

4. The electronic device of claim 3, wherein the instructions, when executed by the at least one processor individually or collectively, further cause the electronic device to apply a median value of the characteristics of the first correction filter and the characteristics of the second correction filter, while the movement distance changes from the first range to the second range.

5. The electronic device of claim 3, wherein the instructions, when executed by the at least one processor individually or collectively, further cause the electronic device to apply a third correction filter in case that the movement distance is in a third range.

6. The electronic device of claim 5, wherein the instructions, when executed by the at least one processor individually or collectively, further cause the electronic device to differently apply the third correction filter according to a volume size of the audio signal produced from the speaker.

7. The electronic device of claim 1, wherein the instructions, when executed by the at least one processor individually or collectively, cause the electronic device to, in correcting the characteristics of the audio signal:
- in case of obtaining an input which turns on a configuration to correct audio output, perform correction of the characteristics of the audio signal, and
- in case of obtaining an input which turns off the configuration to correct audio output, not perform correction of the characteristics of the audio signal.

8. The electronic device of claim 1, further comprising:
a display movement detection sensor,
wherein the instructions, when executed by the at least one processor individually or collectively, further cause the electronic device to detect the movement distance of the second housing with respect to the first housing using the display movement detection sensor.

9. The electronic device of claim 1, wherein the first passage, the second passage, and the third passage have a shape of multiple holes.

10. The electronic device of claim 1, wherein the instructions, when executed by the at least one processor individually or collectively, cause the electronic device to, in correcting the characteristics of the audio signal, tune the audio signal, adjust volume of the audio signal, and adjust amplification of the audio signal.

11. The electronic device of claim 10, wherein the instructions, when executed by the at least one processor individually or collectively, further cause the electronic device to adjust amplitude of the audio signal for each frequency band section.

12. The electronic device of claim 1, wherein the second housing comprises:
- an inner housing and an outer housing;
- fixing protrusions configured to fix the flexible display and arranged on the outer housing; and
- fixing holes configured to seat the fixing protrusions thereinto and formed through the inner housing.

13. The electronic device of claim 1,
wherein the memory is configured to store the characteristics of the audio signal corresponding to the movement distance, and
wherein the instructions, when executed by the at least one processor individually or collectively, further cause the electronic device to correct the characteristics of the audio signal produced from the speaker based on the characteristics of the audio signal stored in the memory.

14. The electronic device of claim 13, wherein the instructions, when being executed by the at least one processor individually or collectively, causes the electronic device to identify a correction filter based on the characteristics of the audio signal stored in the memory.

15. The electronic device of claim 14,
wherein the instructions, when executed by the at least one processor individually or collectively, cause the electronic device to:
- apply a first correction filter in case that the movement distance is in the first range, and
- apply a second correction filter in case that the movement distance is in the second range, and
wherein the first correction filter and the second correction filter are configured based on a case where the movement distance is in a third range.

16. An electronic device comprising:
a first housing and a second housing coupled to the first housing to be movable with respect to the first housing;
- a speaker included in the first housing and being output an audio signal;
- a flexible display disposed in the first housing and the second housing and movable according to the second housing;
- at least one processor; and
- memory storing at least one computer program including computer-executable instructions, and
wherein a first pipe passage is formed in the first housing to allow the audio signal to be output to the outside of the first housing,
wherein a second pipe passage is formed in the second housing,
wherein in a state where a movement distance of the flexible display with respect to the first housing is in a first range, the second pipe passage is positioned at a position corresponding to the first pipe passage to allow the audio signal to be output to the outside of the electronic device,
wherein the instructions, when executed by the at least one processor individually or collectively, cause the electronic device to:
- detect the movement distance of the flexible display with respect to the first housing, and
- change characteristics of the audio signal to be produced from the speaker based on a pipe condition according to the movement distance of the second housing.

17. The electronic device of claim 16, wherein, in a state where the movement distance of the flexible display with respect to the first housing is in a second range, the audio signal is output to the outside of the electronic device.

18. The electronic device of claim 17, wherein the instructions, when executed by the at least one processor individually or collectively, further cause the electronic device to:
- apply a first correction filter in case that the pipe condition is in a first state, and
- apply a second correction filter in case that the pipe condition is in a second state.

19. The electronic device of claim 16, wherein the instructions, when executed by the at least one processor individually or collectively, further cause the electronic device to:
- provide the changed audio signal corresponding to the pipe condition to a user as a preview.

20. The electronic device of claim 16, wherein the instructions, when executed by the at least one processor individually or collectively, further cause the electronic device to:
- apply a third correction filter in case that the pipe condition is in a third state.

21. One or more non-transitory computer readable storage media storing one or more computer-executable instructions that, when executed by one or more processors of an electronic device individually or collectively, cause the electronic device to perform operations, the operations comprising:
- detecting a movement distance of a second housing with respect to a first housing,
- in a case that the movement distance is in a first range, changing characteristics of an audio signal to be produced from a speaker according to a first audio output path in which the audio signal is passed through a first passage formed in the first housing and a second passage formed in the second housing, and
- in a case that the movement distance is in a second range, changing characteristics of an audio signal to be produced from a speaker according to a second audio output path in which the audio signal is passed through the first passage formed in the first housing and a third passage formed in the second housing.

\* \* \* \* \*